United States Patent [19]
Khandkar et al.

[11] Patent Number: 5,763,114
[45] Date of Patent: Jun. 9, 1998

[54] INTEGRATED REFORMER/CPN SOFC STACK MODULE DESIGN

[75] Inventors: Ashok C. Khandkar, Salt Lake City; Singaravelu Elangovan, Sandy, both of Utah

[73] Assignee: Gas Research Institute, Chicago, Ill.

[21] Appl. No.: 819,859

[22] Filed: Mar. 17, 1997

Related U.S. Application Data

[63] Continuation of Ser. No. 461,548, Jun. 5, 1995, abandoned, which is a continuation of Ser. No. 300,784, Sep. 1, 1994, abandoned.

[51] Int. Cl.$^6$ ............................................. H01M 8/06
[52] U.S. Cl. ............................... 429/20; 429/30; 429/34
[58] Field of Search ........................... 429/17, 12, 19, 429/20, 26, 30, 32, 34, 38, 39

[56] References Cited

U.S. PATENT DOCUMENTS

| | | | |
|---|---|---|---|
| 3,266,938 | 8/1966 | Parker et al. | 136/86 |
| 3,394,032 | 7/1968 | Danner. | |
| 3,488,224 | 1/1970 | Craig. | |
| 3,488,226 | 1/1970 | Baker et al. | 136/86 |
| 4,254,086 | 3/1981 | Sanders. | |
| 4,374,184 | 2/1983 | Somers et al. | 429/17 |
| 4,476,196 | 10/1984 | Poeppel et al. . | |
| 4,476,197 | 10/1984 | Herceg. | |
| 4,490,444 | 12/1984 | Isenberg. | |
| 4,496,373 | 1/1985 | Behr et al. . | |
| 4,499,663 | 2/1985 | Zwick et al. . | |
| 4,510,212 | 4/1985 | Fraioli. | |
| 4,522,894 | 6/1985 | Hwang et al. | 429/17 |
| 4,640,875 | 2/1987 | Makiel. | |
| 4,647,516 | 3/1987 | Matsumura et al. . | |
| 4,650,727 | 3/1987 | Vanderborgh et al. . | |
| 4,664,987 | 5/1987 | Isenberg. | |
| 4,702,973 | 10/1987 | Marianowski | 429/41 |
| 4,721,556 | 1/1988 | Hsu. | |
| 4,729,931 | 3/1988 | Grimble | 429/17 |
| 4,732,822 | 3/1988 | Wright et al. . | |
| 4,750,918 | 6/1988 | Sirkar. | |
| 4,753,857 | 6/1988 | Hosaka. | |
| 4,761,349 | 8/1988 | McPheeters et al. . | |
| 4,791,035 | 12/1988 | Reichner. | |
| 4,808,491 | 2/1989 | Reichner | 429/13 |
| 4,824,742 | 4/1989 | Parry. | |
| 4,853,301 | 8/1989 | Granata, Jr. et al. . | |

(List continued on next page.)

OTHER PUBLICATIONS

Dokiya et al., "Train Cell Stack By Wet Fabrication Processes", IFCC The International Fuel Cell Conference, IV-B-6, pp. 309-312, Feb. 1992.

Primary Examiner—Anthony Skapars
Attorney, Agent, or Firm—Dick and Harris

[57] ABSTRACT

A thermally integrated reformer (10) is located inside the stack furnace (12) housing stacks (14) of solid oxide fuel cells (16). The energy to support the endothermic reformation reaction converting hydrocarbon and water feedstock into hydrogen and carbon monoxide fuel is supplied by heat recovered from the oxidation process in the stack (14) of fuel cells (16). The source of hydrocarbons is desulfurized natural gas. Heat transfers to reformers (10) which may be incrementally shielded packed beds (30, 60) of the reactors (18, 19) of the reformer (10) by radiation from the stacks (14), furnace wall (38), or both and by forced convection from the exhausting airflow exiting the stack furnace (12). Temperature gradients in the reformer (10) may be controlled by selective (or incremented) radiation shielding (20) and by counterflow heat exchange to prevent excessive premature cracking in the reformer. Such an optimized design uses a minimum amount of catalyst, yet prevents carbonization from clogging interstices or otherwise rendering the catalyst or catalyst granules (32) ineffective. Alternatively sufficient catalyst may be provided to render the reformation process a heat-limited reaction. In this circumstance, the stacks (132) configured in a module (106) may transfer heat directly to a reformer (110) surrounding the module (106). The air may pass through a heat exchanger 108 or preheater (200) positioned proximate the module 106 in an insulated enclosure (102).

12 Claims, 14 Drawing Sheets

U.S. PATENT DOCUMENTS

| | | | |
|---|---|---|---|
| 4,874,678 | 10/1989 | Reichner . | |
| 4,876,163 | 10/1989 | Reichner . | |
| 4,877,506 | 10/1989 | Fee et al. . | |
| 4,877,693 | 10/1989 | Baker . | |
| 4,885,142 | 12/1989 | Suitor et al. . | |
| 4,910,100 | 3/1990 | Nakanishi et al. . | |
| 4,913,982 | 4/1990 | Kotchick et al. . | |
| 4,943,494 | 7/1990 | Riley . | |
| 4,963,442 | 10/1990 | Marianowski et al. . | |
| 4,983,471 | 1/1991 | Reichner et al. . | |
| 5,045,413 | 9/1991 | Marianowski et al. . | |
| 5,069,987 | 12/1991 | Gordon | 429/31 |
| 5,077,148 | 12/1991 | Schora et al. . | |
| 5,079,105 | 1/1992 | Bossel . | |
| 5,082,751 | 1/1992 | Reichner . | |
| 5,145,754 | 9/1992 | Misawa et al. | 429/32 |
| 5,175,062 | 12/1992 | Farooque et al. . | |
| 5,186,806 | 2/1993 | Clark et al. . | |
| 5,188,910 | 2/1993 | Ishihara et al. . | |
| 5,219,673 | 6/1993 | Kaun | 429/32 |
| 5,227,256 | 7/1993 | Marianowski et al. . | |
| 5,238,754 | 8/1993 | Yasuo et al. | 429/30 |
| 5,252,409 | 10/1993 | Akagi . | |
| 5,269,902 | 12/1993 | Khandkar et al. . | |
| 5,270,129 | 12/1993 | Ishida | 429/32 |
| 5,273,839 | 12/1993 | Ishihara et al. | 429/34 |
| 5,298,341 | 3/1994 | Khandkar et al. . | |
| 5,340,664 | 8/1994 | Hartvigsen . | |
| 5,366,819 | 11/1994 | Hartvigsen et al. | 429/17 |
| 5,376,472 | 12/1994 | Hartvigsen et al. | 429/32 |

INTEGRATED REFORMER/CPN SOFC STACK MODULE DESIGN

This is a file wrapper continuing application of application Ser. No. 08/461,548, filed Jun. 5, 1995, now hereby abandoned, which, in turn, was a file wrapper continuing application of 08/300,784, filed Sep. 1, 1994, now abandoned.

TECHNICAL FIELD

The invention generally relates to solid oxide fuel cells and particularly to stack furnaces housing fuel cell stacks linked to integrated reformers for reforming hydrocarbon and water feedstocks into fuel for the fuel cell stacks.

BACKGROUND ART

Fuel cells convert chemical energy in the form of chemical bond potential to electrical energy in the form of electric current. Fuel cells convert this energy with very high efficiencies, producing negligible pollution in the process.

Like a battery, a fuel cell converts electrochemical energy into electrical current and may use liquid electrolytes between electrodes. Like a battery, a typical fuel cell supports oxidation and reduction, which occur on opposite sides of a "selectively-permeable" barrier separating electrodes. The barrier passes only selected species, such as oxygen ions, between its two sides so that oxidation and reduction may both proceed at opposite electrodes. Like a battery, the fuel cell passes electrons released at the oxidation electrode back to the reduction electrode. The resulting current flow can be directed to an electrical load attached to the electrodes by leads.

Solid oxide fuel cells (SOFC) are a relatively recent innovation in which two porous electrodes, bonded to a solid oxide ceramic between them, form the selectively-permeable barrier. On one side of the barrier is a fuel, on the other side is oxygen. No reactants can pass through the barrier, but oxygen ions can flow through the solid oxide lattice. The electrodes are typically formed of electrically conductive metallic or semiconducting ceramic powders, plates or sheets which are porous to reactant and product gas species.

Suitable fuels include hydrogen and simple hydrocarbons. Hydrogen was an early favorite fuel, but is problematic for generation, storage, handling, and resultant cost. Simple hydrocarbons, such as methane ($CH_4$), can be used, but are preferably reformed into simpler reactants prior to entering the fuel cell to be efficiently oxidized in the fuel cell. U.S. Pat. No. 4,910,100 (Nakanishi et al.) issued Mar. 20, 1990 describes the reformation process.

As an outgrowth of the aerospace industry, fuel cells are well documented in the art along with the preheating and reformation processes which prepare fuels for rapid reaction in solid oxide fuel cells. For example, the aforementioned Nakanishi et al. patent discusses the four most common types of fuel cells, their electrolytes and chemical reactions, and ways to increase the efficiency of reactions. Nakanishi et al. also discuss the temperatures of reformation and a method for extracting the heat of reaction to drive the reformation process within a fuel cell.

U.S. Pat. No. 5,298,341 (Khandkar et al.), issued Mar. 29, 1994, discloses stacks of rectangular, solid oxide fuel cells arranged in tiers manifolded together in parallel from a central air plenum and in series from a fuel plenum. U.S. Pat. No. 4,876,163 (Reichner), issued Oct. 24, 1989, discloses various interconnected, cylindrical fuel cells arranged to uniformly distribute the temperature. U.S. Pat. No. 4,721,556 (Hsu), issued Jan. 26, 1988, discloses a stack of interconnected solid oxide fuel cells. U.S. Pat. No. 4,943,494 (Riley), issued Jul. 24, 1990, discloses a system of integrated fuel, air and exhaust conduits which support the operation of fuel cells in a compact arrangement. U.S. Pat. No. 4,983,471 (Reichner et al.), issued Jan. 8, 1991, discloses a fuel cell arrangement in which reformable fuel is exposed to a catalyst just prior to reaction in the solid oxide fuel cells. Likewise, U.S. Pat. No. 5,079,105 (Bossel), issued Jan. 7, 1992, discloses a solid oxide fuel cell in which an endothermic reformation process occurs inside the center of a stack of fuel cells as the fuel is distributed.

Packed beds of granular or pelletized material having a catalyst as a surface coating are known. The packed bed may be called a reactor, reactor bed, or the like. The use of such packed beds to serve as reformers is known. The beds are effective because of the long tortuous path that exposes reactants to a large surface area of catalyst during an extended dwell time during passage through the bed.

A stack of solid oxide fuel cells operating at temperatures over 1000° C. is contained within a chamber called a stack furnace. The stack is an assembly of several fuel cells assembled in close proximity, typically sharing intermediate walls. Since the endothermic reaction of reforming a feedstock into a suitable fuel requires almost a third of the exothermic heat of combustion, heat has been recovered from stack furnaces to drive the associated reformation reactions. Transferring the recovered heat from a stack furnace to an external (remote) reformer often implies unacceptable bulk, heat losses, and temperature losses.

Some fuel cells dispense with the reformer, relying instead on anodic reformation in the stack of fuel cells itself. Anodic reformation is a process by which feedstock simply arrives in a fuel cell and reforms at the anode before oxidizing them to produce electrical current. The presence of so many intermediate reactions and species at the anode creates an access problem. An "atomic or molecular traffic jam" is believed to occur as atoms try to reach proper reaction sites with the requisite energy. All reactions slow. The rate-limiting reaction in the chain of reactions occurring during the process may be as severely affected as any other. The resulting inefficiency of this overall process detracts from the mechanical simplicity of the scheme.

Internal reformers placed directly inside the stack furnace recover the heat and temperature losses experienced by remote reformers without burdening the fuel cells' anodes with the reformation duty. However, such placement is not without problems. For example, in the temperature range of reformers in the stack furnace, the formation of elemental carbon is rapid, even overwhelming.

The cracking process, which dissociates the constituent atoms of carbon and hydrogen from methane, is temperature sensitive. At the same time, little energy is required to break the interatomic bonds. Thus, the cracking process converting methane to elemental carbon, can occur very rapidly with minimal energy so long as a high temperature is maintained in the feedstock. In an internal reformer, such a condition exists inherently.

Carbon coats and damages catalytic surfaces and clogs interstices within the reactor bed of the reformer. Agglomerated elemental carbon does not react as readily as individual atoms in the flow through the reformer. Therefore, both effects tend to be irreversible, rendering much of the catalytic surface inaccessible, useless or both.

The reformation process, properly controlled, is a balancing act to keep the multiple reactions operating at a point close to thermodynamic equilibrium. No individual reaction, such as carbon formation, should be permitted to get out of control. Thermodynamic equilibrium is maintained by controlling the species present, the temperature of the flow, and the heat flux into the flow. The need for thermodynamic equilibrium is largely dependent on the cracking process which tends to form elemental carbon. That reaction, with the corresponding dissociation of the constituent atoms in water, is balanced against the twin formation processes creating carbon dioxide and hydrogen.

While cracking occurs rapidly, the recombination of the atomic constituents of steam and hydrocarbons into fuel does not. Carbon monoxide and hydrogen form slowly, limited by the rate-limiting reactions of the reformation process. Formation of carbon monoxide and hydrogen fuel also requires the majority of the energy of reformation. In addition, the steam constituent in the feedstock absorbs energy during dissociation. Also, the formation of carbon monoxide and hydrogen is not augmented so much by temperatures elevated above a minimum value as it is by dwell time. Access time is required to allow free atoms to find sites for recombination.

Of course, as a reaction begins at one end of a long reformer, the feedstock will be rich in unreformed hydrocarbons. Therefore, in light of the ease of cracking, excessive temperature may become particularly onerous, while site availability for recombination is low. Thus, the minimum temperature suitable for recombination should not be exceeded or the reformation and indeed the reformer may be overwhelmed by cracking.

Likewise, toward the end of a long reformer, the flow will be rich in fuel, and elevated temperatures may be helpful to increase the vigor of the reaction of the little remaining feedstock. Particularly since reaction sites are more widely dispersed, a high atomic collision rate is needed to drive the reaction rates of reformation. Likewise, with little feedstock remaining, carbonization of the catalyst in the reactor bed is less likely to be a problem.

DISCLOSURE OF THE INVENTION

An ideal reformer will maintain the temperature, heat flux and species concentrations at values which maintain the desired thermodynamic equilibrium. Thus, what is needed for an internal reformer is a system for distributing the temperature along the flow path of the feedstock in the reactor bed of a reformer. Heat transfer should be managed to provide adequate energy as heat flux to the endothermic processes at a temperature which is appropriate to the reaction kinetics, flow rate and dwell time. Such a system should prevent carbonization in feedstock-rich portions of the flow path. It should also ensure that reformation is as nearly complete as possible at the end of the flow path. That is, it should maximize reformation while minimizing carbonization due to excessive early cracking. It should match species concentrations, heat transfer and temperature throughout, yielding a smoothly declining feedstock-to-fuel ratio. Reaction sites for forming fuel will at first be plentiful, then dispersed, as the feedstock represents a decreasing fraction of the fluid stream in the reformer. Conversion rates approaching 100 percent should be achieved with no carbon build-up in reformers of commercially reasonable size.

The invention includes a radiation-shielded, counterflow, thermally integrated reformer in a stack furnace. The reformer is located in the stack furnace, exposed to the forced convection of exhaust gases and the radiation of a stack of fuel cells and the furnace walls. However, portions of the reformer are shielded from radiation to differing degrees in order to provide graduated temperature and limited heat transfer. Meanwhile, the reformer employs counterflow heat exchange from downstream flows rich in hot fuel to upstream flows rich in the cooler feedstock.

The invention also includes a thermally integrated reformer having a reactor bed positioned in the reformer for reacting a feedstock to a fuel, an inlet for conducting the feedstock into the reformer, apparatus for exchanging heat between a solid oxide fuel cell and the feedstock at a rate proportional to the rate of formation of the fuel, and an outlet positioned to receive the fuel from the reactor bed for conducting the fuel to the solid oxide fuel cell. The reformer includes structure for controlling the temperature of the feedstock in the reformer to minimize formation of elemental carbon.

A heat exchanging apparatus is positioned to transfer heat from the stack and a wall of the stack furnace to the reactor bed. The heat exchanging apparatus includes structure for transferring heat from the stack by radiation and structure for transferring heat by forced convection. Forced convection occurs by flowing exhausted air from the stack over the reactor beds of the reformer. Forced convection also occurs in counterflow as the exhausting air is vented from the stack furnace to ambient. The wall of the stack furnace may contain a corrugated counterflow heat exchanger that recuperates the heat in exhausted air into incoming air directed to the stacks.

The heat exchanging apparatus includes apparatus for shielding a portion of the reactor bed from radiation. The shielding apparatus is graduated along the fluid flow path for maintaining a thermal gradient along a length of the flow path through the reactor bed. The shielding apparatus can be satisfactorily graduated if done in at least three stages. The reformer located in the plenum of the stack furnace is thus exposed to radiation from the stack and the wall of the stack furnace in graduated stages.

Feedstock passes through the reformer by counterflow. Feedstock passes into an inlet of the reformer and through a bed of catalytic particles or granules, called a packed bed or a reactor bed, designed to contact the feedstock along the length of the bed through a tortuous path. The bed can be multiple beds, which can operate in series. The heat transfer and temperature are higher at the closed end than at the end where the inlet and outlet of the bed are positioned. The flow then reverses at the closed end of the bed, flowing down a central tube extending back through the bed along almost the entire length of the bed to the outlet. The exiting flow thus exchanges heat with the incoming flow. These flow directions result in a counterflow heat exchanger within the bed. A recuperative counterflow heat exchange process in the fuel flow path helps to establish and regulate a temperature gradient throughout.

At the inside wall of the stack furnace, a counterflow heat exchanger employs a corrugated fin captured between two layers or walls of high temperature sheet metal. To recover the exhaust heat from the furnace, exiting air passes through outgoing channels formed by the continuous fin and one sheet metal wall. Incoming air passes in counterflow through channels along the opposite sheet metal wall on the opposite side of the fin, thereafter discharging into the fuel cell. Thus, the entire airflow, from its inlet through the walls of the stack furnace, through the stack or stacks, to the plenum of the stack furnace, through the walls of the stack furnace again to the exit, is a recuperative counterflow convective heat transfer process.

By recuperating heat from exiting flows into incoming flows, flowing in opposite directions, each convective heat exchanger is a recuperative counterflow heat exchanger. The system also recuperates the otherwise lost heat of reaction from the fuel cells, transferring it back into the stack furnace to heat the stacks and the reformer. The convection is forced because both the feedstock or fuel flow path and the airflow path are driven by pumps.

Other counterflows exist. The forced convection may move in counterflow over the beds of the reformer. However, radiation coupling is so dominant, that such is not necessary. Although the flow of exhaust fluids from the fuel cells can pass in true counterflow over the beds, which may be modular, the radiation shielding gives a counterflow effect by graduating the temperature along the beds. Likewise, radiation heat transfer from the stacks to the walls of the finned, corrugated heat exchanger is recuperated by the incoming air.

Several reactor beds may be connected in series, each with a different shielding arrangement to promote a graduated temperature along the entire flow path through the series. Satisfactory results are possible with two beds in series. A larger number of beds (modules), with their associated apparatus, may be effectively connected in series. The heat exchanging processes and separation or flow streams necessitate a container surrounding the reactor bed for containing the catalytic particles and the flow of feedstock. The container is a good conductor of heat and must maintain its mechanical integrity near 1000° C.

The feedstock is a combination of steam and hydrocarbons, such as methane or petroleum constituents suitably vaporized, passing through a reformer employing a reactor bed positioned within the plenum of a stack furnace surrounding a stack of solid oxide fuel cells. The entire apparatus comprises a stack of fuel cells for generating electricity from oxidizing fuel, a stack furnace surrounding the fuel cell for containing the heat and fully combusting the fuel into exhaust, a corrugated-fin-type counterflow heat exchanger positioned at the wall of the stack furnace for recuperating heat from the exiting air stream into the incoming air stream, and a reformer positioned to receive heat from the stacks and walls of the furnace for providing heat to reform the feedstock into fuel to be fed into the fuel cells.

The fuel cell includes a cathode for forming and passing oxygen ions. An anode is spaced apart from the cathode for reacting hydrogen and carbon monoxide with oxygen ions. A solid oxide electrolyte is positioned between these electrodes, and in intimate contact with both the anode and the cathode for passing oxygen ions from the cathode to the anode. Leads between these electrodes pass electrons from the anode to the cathode for forming oxygen ions.

The reformer includes a packed bed positioned to receive the feedstock and to receive heat from the stack furnace for reforming the feedstock into fuel. The packed bed includes a catalyst for enhancing the reformation of the feedstock into fuel. The reformer and stack furnace include integral apparatus for exchanging heat between the air exhaust and the feedstock, between the air exhaust and incoming air, between the stacks and the incoming air, and between the stacks and the feedstock. The heat exchanging apparatus is thus all positioned within the stack furnace and includes the stack, the wall of the stack furnace, the container or enclosure of the packed bed, and the granules of the packed bed as part of the mechanism to transfer heat to the fluids entering the stack and the reformer. The apparatus for heat exchange is completely integrated.

Air exhausted from the stack passes into the plenum of the stack furnace. The wall of the stack furnace is formed by a corrugated-fin-type counterflow heat exchanger for receiving air from the plenum. Incoming air to be reacted in the stack first flows through the corrugated fin heat exchanger, separated from exhausting air by only the thin corrugated metal fin. Heat from the airflow exhausted from the plenum of the stack furnace thus transfers into the airflow being inducted into the fuel cell stack.

Heat transferred by radiation from the stacks to the furnace walls is partially re-radiated back into the furnace. The heat is partially convected by the corrugated fin heat exchanger into the airflows. The heat exchanging apparatus actually includes the outlet tube passing through the packed bed and the catalytic granules for conducting heat to fluid passing through the packed bed.

Radiation shielding prevents the packed beds of the reformers from "viewing" (receiving direct radiation from) the stack and the furnace walls. The counterflow operation of the packed beds and the radiation shielding combine for graduating the temperature distribution along the length of the packed bed. Likewise, placed in series, with appropriate shielding, a plurality of packed beds maintain a graduated temperature distribution along the entire flow path through the reformer.

The invention also includes a method of using the apparatus for reforming a hydrocarbon and steam feedstock into a fuel of carbon monoxide and hydrogen. The method includes introducing a feedstock into a reactor, exposing the reactor to exhaust from a fuel cell, extracting heat from the exhaust into the reactor, adding heat to the feedstock in the reactor, reforming the feedstock into fuel, and passing the fuel into the fuel cell.

The method also introduces heat into incoming air in a heat exchanger. Air is then directed into the fuel cell where it is partially consumed. The air picks up additional heat from the fuel cell by convection while passing through the fuel cells. The airway picks up very limited heat from the fuel cells by radiation while inside or after exiting the fuel cells. Air exiting the fuel cell is directed through the heat exchanger, transferring heat to the incoming air.

The method includes introducing a flow of feedstock into a reactor positioned inside a stack furnace housing a solid oxide fuel cell, exposing the reactor to radiation and exhaust from the fuel cell and stack furnace. Heat from the stack of fuel cells and from the stack furnace is transferred into the flow, providing energy for reforming the feedstock into fuel. Heat from the downstream flow is transferred into the flow. The fuel is then directed to the fuel cell.

The method also includes establishing a temperature gradient along the length of the reactor by selectively shielding portions of the reactor from the radiation. The method may also introduce the flow into the reactor at a controlled flow rate. Heat is added to the flow at a rate proportional to the rate of the flow for maintaining thermodynamic equilibrium. The method exposes the feedstock to a catalyst in the reactor. The feedstock typically includes a mixture of a hydrocarbon and water. Methane, and natural gas, as well as vaporized diesel and aviation fuels are all suitable hydrocarbons for reformation into a fuel of carbon monoxide and hydrogen.

As used herein, a "reactor" is a bounded region wherein a chemical reaction is fostered. A packed bed type of reactor includes a packing material capable of conducting heat from the walls of the reactor bed into the interior. Typical packing materials in the packed bed include granules of ceramic coated with a catalyst such as nickel-, ruthenium- or zirconium-based materials. The heat is convected and conducted between the packing material and reactants passing through the reactor bed.

A "shield" or "shielding" is any structure which prevents viewing of one radiation heat transfer surface by another. A single layer of material opaque to the radiation wavelengths of interest acts as a shield. Multiple layers are sometimes employed so that a heated shield cannot effectively re-radiate, since it cannot directly view or be viewed by one of the surfaces. Also, any material which is opaque to a radiation spectrum of interest forms a shield. In some instances, a shield may include an insulating material to inhibit re-radiation from the side opposite the principal receiving surface.

A "thermal gradient" is a temperature distribution along a direction, particularly a direction of flow of a heated fluid. Such a temperature gradient is important in counterflow heat exchangers to improve the efficiency of heat transfer. Near the exit of the heat exchanger, the driving temperature of the fluid being cooled is higher than near the inlet, tending to match the gradient in the fluid being heated between the same points. Thus, a substantial temperature differential exists between the driving temperature of the heat source and the temperature of the fluid being heated throughout the entire flow path from inlet to exit.

A thermal gradient is important in practicing the invention to assure that the hydrocarbon reactants reform completely to the desired fuel without depositing elemental carbon in the reactor bed. The rate of breakdown of the hydrocarbon reactants in the feedstock to carbon is relatively rapid. The carbon will be relatively easily formed, but carbon monoxide formation and hydrogen formation occur more slowly. Allowing too high a reaction rate creates carbon faster than it can be reformed into carbon monoxide. Unreacted carbon is of no use, fouling the catalytic surfaces and restricting flow through the interstices in the reactor bed. To prevent a buildup of carbon while obtaining maximum conversion rates of reactants into intermediate products, the temperature gradient along the outside surface of the reactor bed is maintained by shielding against radiation heat transfer. In this way, approximate chemical equilibrium is maintained between the reactants and the intermediate products along the length of the reactor bed. In short, the constituent species and their dwell time in the reactor bed are matched against the heat transfer rate, temperature and the reaction kinetics of the reactions occurring in order to maintain thermodynamic equilibrium throughout the reformer.

Graduated shielding of a refractory material, ceramic or high-temperature metal, may meet the requirement for creating a thermal gradient since radiation heat transfer is such a dominant process. Structural integrity at operational temperatures over 800° C. is required. Thus, the necessary heat of formation is added to the reactants at a rate corresponding to the flow rate of reactants. This implies a rate at which heat can effectively be used without fouling the reactor bed. In the system, the reaction kinetics of the slowest reaction are accommodated by slowing the faster reactions using temperature gradient control and heat flux control.

The arrangement of a flow path must conduct the flow of feedstock into the reformer and through the reformer as the feedstock reacts, converting the flow predominantly into fuel. Counterflow means that a flow path is arranged so that the flow continually transfers heat from itself at a downstream position in the flow path to itself at an upstream position in the flow path. The incoming flow of feedstock may be exposed to heat from a catalytic bed heated by conduction and convection from the walls of its own surrounding container. Heat transfers to the wall of the container by radiation and forced convection inside the stack furnace during the first half of the flow path through the reactor bed. Meanwhile, the exiting flow, dominated by reformed fuel, passes in an opposite direction through the reactor bed by way of a central conduit where it may still continue to reform into fuel as it transfers heat back to the reactor bed.

Also, a corrugated-fin-type heat exchanger that forms the inner wall of the stack furnace may transfer heat from exhausting air to incoming air upstream in the same flow. As air passes out of the stack furnace, it transfers heat to air coming in from an opposite direction. The pre-heated air is then directed into the fuel cell to support oxidation.

A thermally coupled stack furnace (TCSF) may have an enclosure made of a wall surrounding a chamber. The TCSF may be regarded as the stack furnace with all the components contained within the chamber. A stack, positioned within the chamber, has at least one fuel cell incorporating a solid oxide electrolyte for generating electricity by oxidizing a fuel flow passing over one surface with oxygen from an air flow passing over another surface. Operation of the fuel cell produces a fuel exhaust and an air exhaust. A reformer is positioned within the chamber to reform a feedstock into fuel flow by addition of heat radiated to the reformer from the stack. A recuperator may be positioned in fluid communication with the air flow upstream of the stack and the air exhaust downstream of the stack to transfer heat from the air exhaust to the air flow. The recuperator may be configured to heat the feedstock upstream of the reformer, or to receive heat by convection from the air flow or air exhaust.

The thermally coupled stack furnace may combust the fuel exhaust with the air exhaust to form a combustion exhaust having a high water content. A portion of the combustion exhaust may be recycled back into the reformer as a water (steam) constituent of the feedstock. The reformer may be coated internally with a catalyst having a surface area sufficiently large to render reformation of the feedstock into fuel a heat-limited reaction. That is, an abundance of catalyst may be used to prevent fouling or poisoning of the catalyst by assuring that catalysis is not catalyst-limited, but rather limited only by available feedstock (species-limited) or heat for the endothermic reaction of reformation (heat or energy-limited).

In a very basic configuration of integrated reformer, the reformer may be used without sophisticated shielding and counterflow arrangements. For example, the method for reforming a feedstock into a fuel may comprise the step of introducing the feedstock into a reformer containing an excess of effective catalyst and positioned within a furnace to reform the feedstock. Thus, virtually all of the water (steam) and hydrocarbon of the feedstock available at the catalytic surface are reformed, as heat becomes available, into a fuel suitable for oxidation in a solid oxide fuel cell.

The method may also include transferring some portion of the exothermic heat of reaction rejected by the solid oxide fuel cell to the reformer. The reformer, in turn, transfers heat to the feedstock to support the endothermic reformation of feedstock into fuel. A reformer may receive heat directly by radiation from the fuel cell or a stack of fuel cells, and may receive heat by forced convection from the exhaust air stream.

The method may include introducing an air flow and fuel into the fuel cell, while discharging fuel exhaust and air exhaust. Heat may be recuperated from the air exhaust into the air flow or into the feedstock upstream of the reformer.

The invention may be characterized as an integrated stack furnace for thermally coupling an endothermic fuel reformation in a reformer and an exothermic electrochemical reaction in a fuel cell. The integrated stack furnace may include a container having a wall for enclosing a volume. A stack positioned inside the container has at least one fuel cell of the type having a solid oxide electrolyte formed to oxidize a fuel passing over a first surface with oxygen from air passing over a second surface thereof to produce electricity. A reformer is disposed within the container to reform a feedstock to fuel by addition of heat, feeding the fuel to the stack.

A recuperator may be positioned to recuperate heat from the air exiting the fuel cell. The recuperator may be positioned within the container, and may preheat the air flow upstream of the stack or fuel cell. The container may have insulation on an inner or outer surface, to limit convective heat transfer to ambient. The integrated stack furnace may have shielding on an inner or outer surface for reducing radiant heat transfer to ambient.

A first plenum may be positioned in fluid communication with the air at one end of each fuel cell. The reformer may be positioned in the first plenum close to the fuel cell to receive heat by radiation from the fuel cell and by convection from the air.

The invention also includes methods of manufacturing the reformer, and fuel cell assemblies incorporating such reformers.

BRIEF DESCRIPTION OF DRAWINGS

In the drawings, which depict presently preferred embodiments of the invention and in which like reference numerals refer to like parts in different views.

BEST MODE FOR CARRYING OUT THE INVENTION

Figure 1:
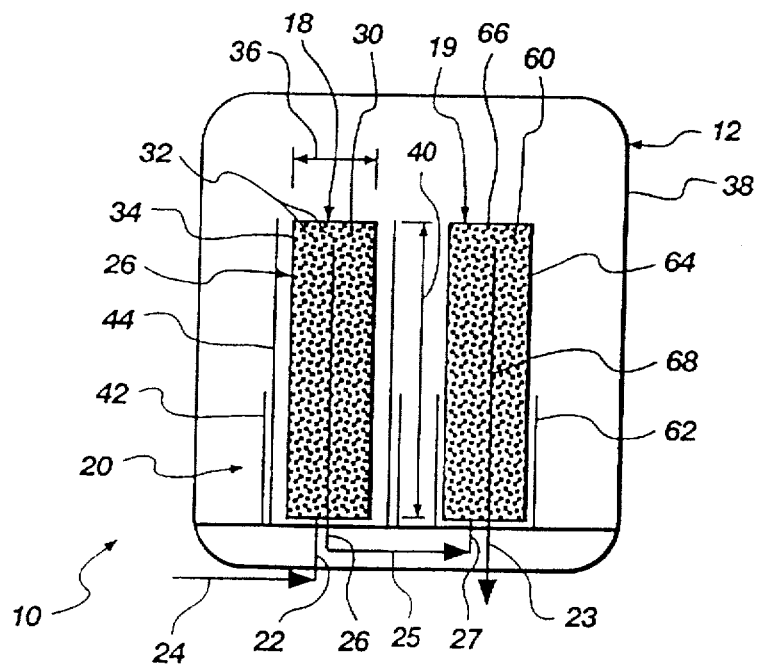
FIG. 1 is a schematic elevation view of the thermally integrated reformer of the invention.
Figure 2:
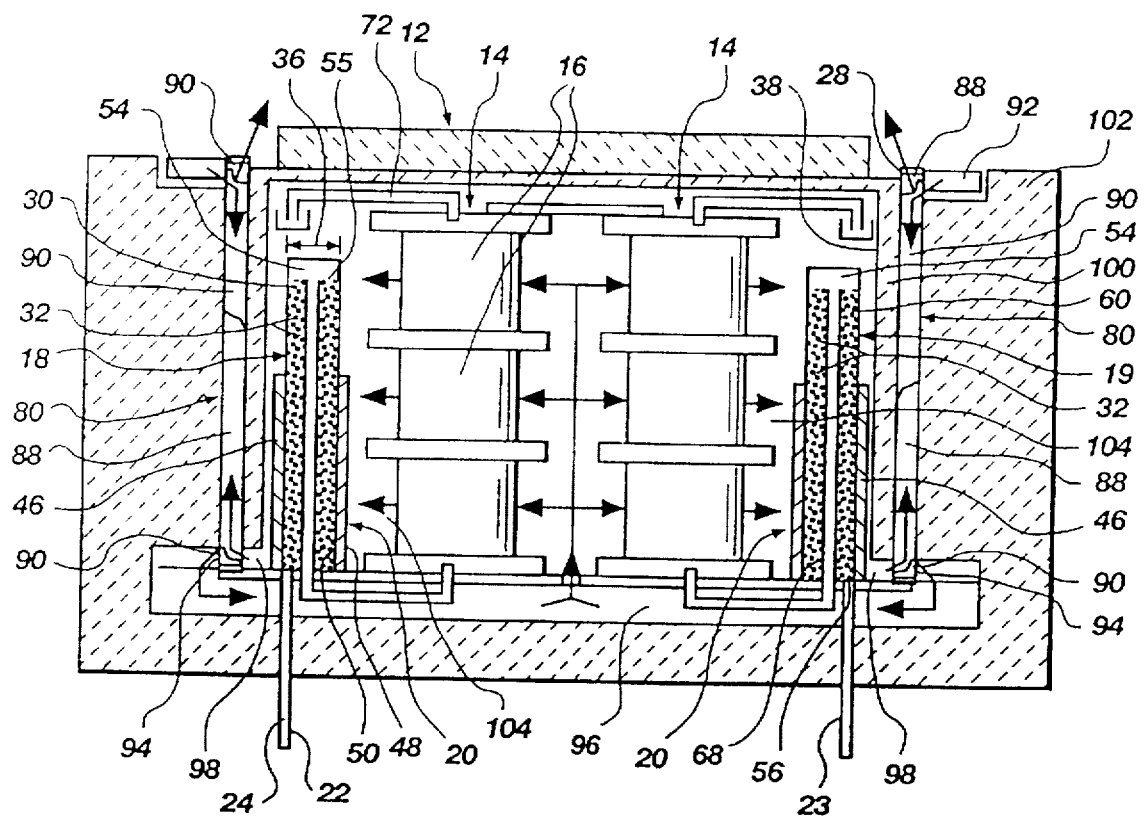
FIG. 2 is a schematic elevation view of a stack furnace containing stacks of fuel cells and thermally integrated reformers of the invention.

The invention is best understood by reference to FIGS. 1 and 2 which show a reformer generally 10 that is implemented by inclusion within a furnace 12, also called a stack furnace, surrounding a stack 14 of individual fuel cells 16. The reactors 18, 19 generally form the principal part of the reformer 10, and are partially shielded from radiation by a shield system 20.

FIG. 2 shows an arrangement of the contents of the stack furnace 12 configured to obtain the benefits of the invention. It is understood that a flow may be of energy or mass, any mass flow may be a mixture of constituents, a fluid may be a liquid or a gas, and energy flowing by virtue of a temperature differential is heat.

The reformer 10 is best understood by following the flows of mass and energy through it. An inlet 22 introduces a flow of feedstock 24 into a first reactor 18. The flow will later pass into a second reactor 19 and out through an outlet 23. The feedstock 24 passing in through the inlet 22 preferably contains water vapor (steam) mixed with a hydrocarbon, such as desulphurized natural gas whose principal constituent is methane. The paths through the reactors 18, 19 are joined by a line 25 connecting an outlet 26 of the reactor 18 to the inlet 27 of the reactor 19. The feedstock 24 is preferably preheated in a remote heat exchanger (not shown) which recovers thermal energy from combusted fuel or the hot air discharged by the air exhaust line 28 exiting the stack furnace 12. After such preheating, the feedstock 24 typically enters the first reactor 18 at a temperature of approximately one hundred fifty (150) degrees Celsius.

The flow passes through a packed bed 30 comprised of pellets or granules 32 having a coating (e.g. nickel, ruthenium) for catalyzing the reformation reaction. The packed bed 30 transfers heat from the container wall 34 to the flow by a combination of conduction and convection. The container wall 34 is preferably cylindrical, having a typical inside diameter 36 of from about two (2) centimeters to about ten (10) centimeters and preferably about five (5) centimeters, and receives heat by radiation and convection from the stacks 14 and from the furnace wall 38. Radiation is not absent inside the packed bed 30, but is not of the order of magnitude of conduction and convection. However, radiation is the most significant mechanism for transferring heat from stacks 14 and furnace walls 38 to the container walls 34 of the reactors 18, 19. From the container walls 34, heat is conducted into the granules 32 which present a tortuous path for conducted heat. Heat is also transferred by convection as the feedstock 24 picks up heat from the container wall 34 and granules 32 and distributes it among the other granules 32 and other fluids in the flow in passing.

The flow passes from the inlet 22 of the first reactor 18 along the length 40 of the packed bed 30 through the granules 32, typically, a distance of from five (5) to fifty (50) centimeters, but preferably approximately thirty (30) centimeters. For the first half of the length 40 of the packed bed 30, the container wall 34 is shielded as shown in FIGS. 1 and 2, and preferably as shown in FIG. 1.

The furnace wall 38 and stack 14 with the airflow they enclose create an environment at approximately 900° C. The outer shield 42 intercepts radiation from the furnace wall 38 and from the stack 14 and heats up to an intermediate temperature. Outer shield 42 then re-radiates to the inner shield 44, which in turn re-radiates to the container wall 34. The resistance to radiation heat transfer provided by the outer and inner shields 42, 44 is substantial. This resistance greatly reduces heat transfer and limits the temperature rise in the container wall 34 of the packed bed 30 to approximately 430° C. In the alternate embodiment of FIG. 3, the outer shield 42 and a portion of the inner shield 44 are replaced by an insulated shield 46 which intercepts radiation at its outer surface 48, but insulates against re-radiation by its inner surface 50. Such an arrangement results in a region which is almost adiabatic near the inlet 22 of the packed bed 30.

As the flow passes through the packed bed 30, it begins cracking at a rate controlled by the temperature in the packed bed 30. Reformation progresses at a rate controlled principally by the rate of heat transfer into the flow, the temperature, the species present, and their reaction kinetics to maintain approximate thermodynamic equilibrium. For example, the flow of heat to support the endothermic reactions of reformation is balanced against the flow rate to limit cracking the feedstock 24 at a corresponding rate.

As the flow passes through the second half of the packed bed 30, only the inner shield 44 operates to limit radiation to the container wall 34. As a result, the temperature of the container wall 34 at the top of the packed bed 30 is approximately 695° C. Of course, no homogeneous material will support a step change in temperature distribution, so the temperature of the container wall 34 is approximately 503° C. where the outer shield 42 stops and the inner shield 44 continues. The same effect can be achieved whether construction relies on double shielding or insulated shielding methods.

At the top of the packed bed 30, the flow collects into a return pipe 52, and may be aided by a plenum 54 as shown in FIG. 2. The inside diameter 53 of the return pipe 52 typically varies from three (3) millimeters to three (3) centimeters depending on the installation and is preferably about one (1) centimeter. As the flow passes into the return pipe 52 toward the outlet 55, the flow has been exposed to the highest temperature experienced in the packed bed 30. As the flow courses toward the outlet 54, it passes through portions of the packed bed 30 which are at lower temperatures. The result of this counterflow through the packed bed 30 is heat transfer from the flow in the return pipe 52 to the packed bed 30, further contributing to the establishment of a smooth temperature gradient along the length 40 of the packed bed 30.

Figure 3:
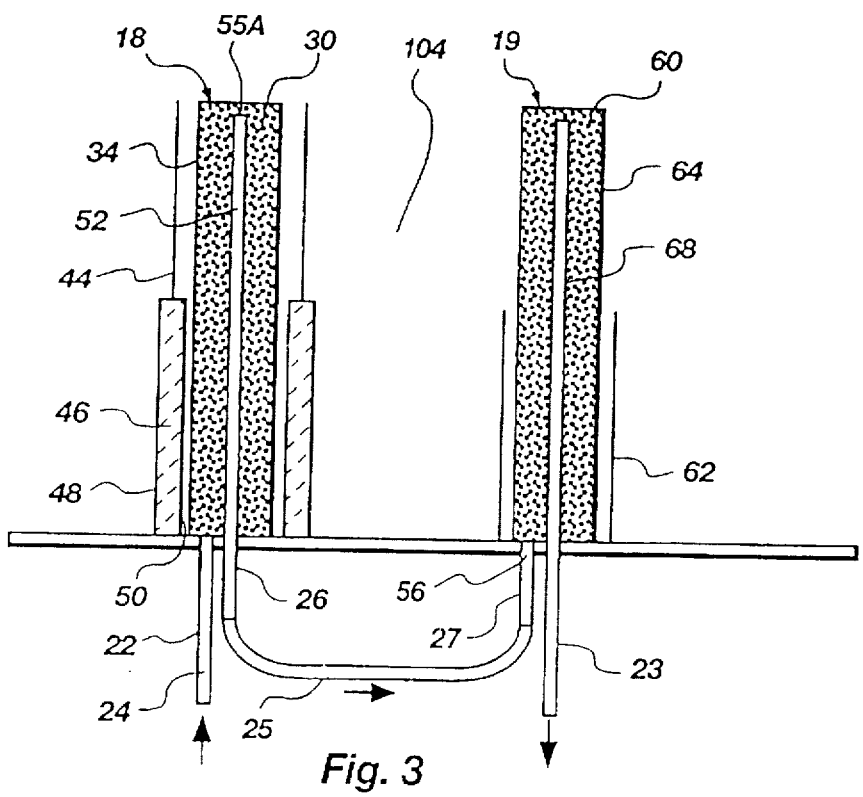
FIG. 3 is a schematic elevation view of an alternate embodiment of the reformer.

As best seen in FIGS. 1–3, the flow is conducted from the outlet 55 of the packed bed 30 to the inlet 56 of a packed bed 60 of the second reactor 19. The shielding 62 around the container wall 64 of the packed bed 60 limits the radiation heat transfer received by the container wall 64 from the furnace wall 38 and stack 14. The resulting temperature at the container wall 64 is approximately 730° C. near the inlet 56.

As the flow passes through the packed bed 60, it continues to crack and reform at increasing temperatures. Approximately halfway along the packed bed 60, the shielding 62 ceases, leaving the container wall 64 fully exposed to the 900° C. environment. The temperature of the container wall 64 at mid-height is approximately 800° C. As the packed bed 60 protrudes into the stack furnace 12 without shielding, the temperature of the container wall 64 at the top end 66 approaches 900° C.

As in the first packed bed 30, the flow passes out of the packed bed 60 through another return pipe 68 which passes back through the entire length 40 of the packed bed 60 to the outlet 23. Along the return pipe 68, which is preferably of the same size and construction as the return pipe 52, the flow exchanges heat with the packed bed 60 contributing to a smooth temperature distribution along the packed bed 60. The feedstock 24 in the flow continues to reform until almost all of the flow is fuel. Reformation efficiencies above ninety-nine percent (99%) are typical. After exiting at the outlet 23, the fuel in the flow is conducted to the fuel cells 16 in the stacks 14.

The airflow and the fuel flow are separated streams in the fuel cell 16 as known in the art of solid oxide fuel cells. The reacted fuel exits the fuel cell 16 into the stack furnace 12 and then passes out the fuel exhaust line 72 to be used for preheating any incoming flows, preferably the incoming air in a separate heat exchanger (not shown).

The product of mass and specific heat is higher for the airflow, so the airflow exits the stack 16 into the stack furnace to heat the stack furnace 12 including the furnace wall 38 and the stack 16. This exhaust gas heats the reformer 10 by effectively forced convection while the furnace wall 38 and stack 16 heat the reformer 10 by radiation.

Figure 5:
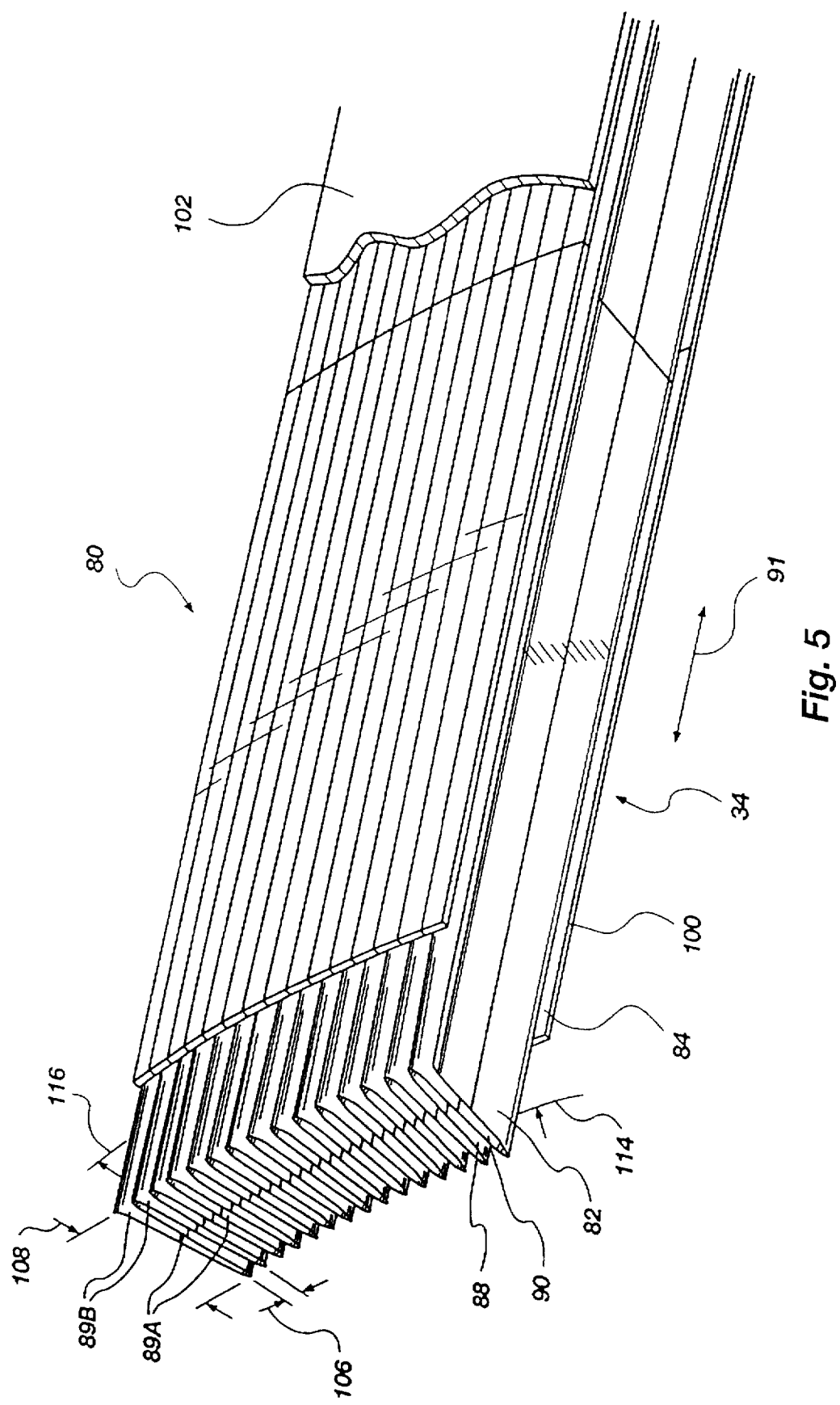
FIG. 5 is an isometric cutaway view of the heat exchanger installed in the apparatus of FIG. 2.

The exhausted airflows from the plenum of the stack furnace 12 into the heat exchanger 80 of FIGS. 2 and 5. In FIG. 2, the airflows appear to be going in two directions in the heat exchanger 80. However, as shown in FIG. 5, the fin 82 is preferably a continuous corrugated layer of metal, sandwiched between an inner wall 84 and an outer wall 86 which together form two adjacent sets of channels 88, 90 enclosed by the inner wall 84 and outer wall 86, respectively. One side 89A of the corrugated metal fin 82 is exposed to exhausting air while the other side 89B is exposed to incoming air. The intimate association of the two airflows provides preheated air for the fuel cells 16 in the stack 14 while acting as a recuperative counterflow heat exchanger to extract heat from the exhausting air.

Incoming air arrives from the air intake 92, passing through the channels 90, the air induction port 94 and the plenum 96 into the stacks 14. Exiting air leaves the stacks 14, passing over the reformer 10 and exiting through the exhaust port 98 into the channels 88. It will eventually go into the air exhaust line 28. The exiting air has already given up much of its heat to the reformer 10 and continues along the channels 88 to transfer heat across the fin 82 to the incoming air. Meanwhile, the incoming air receives initial heat in the channel 90 across the fin 82 before passing into the plenum 96 on its path to the stacks 14.

Thus, the counterflow effect pervades the preferred embodiment of the invention. For feedstock conduits, which become fuel lines as reformation progresses, and for air conduits, from initial incoming flows to exhausted outgoing flows, the counterflow arrangement described transfers the heat from outgoing flows to incoming flows. The system thus provides energy for reformation by recuperating the energy released by the exothermic chemical reactions and the ohmic losses in the fuel cells 16. Moreover, the thermally integrated reformer 10 efficiently recovers the heat needed to drive its endothermic reformation processes at temperatures throughout that do not promote excessive, premature cracking.

Other embodiments of the invention are best understood by reference to FIGS. 8–23, which illustrate a thermally coupled stack furnace (TCSF) 102. The TCSF 102 includes an enclosure 104 surrounding a module 106, heat exchanger 108, and reformer 110.

The enclosure 104 includes a structural wall 112, which may be positioned outside (see FIG. 8) or inside (see FIG. 9) of an insulating wall 114. The structural wall 112 may be provided with outer supports for standing on a surface such as a floor or the ground, and inner supports for supporting the module 106 inside. The structural wall 112 may be continuous or assembled from any number of pieces, and may be cylindrical, as shown, or rectangular.

The structural wall 112 typically includes a top panel 116, bottom panel 118 and side panel 120. Positioned near or against the surfaces 122A, 122B, 122C in FIG. 9 (or 123A, 123B, 123C if arranged in the configuration of FIG. 8) of the structural wall 112 are top panel 124, bottom panel 126, and side panel 128 of the insulating wall 114.

Figure 9:
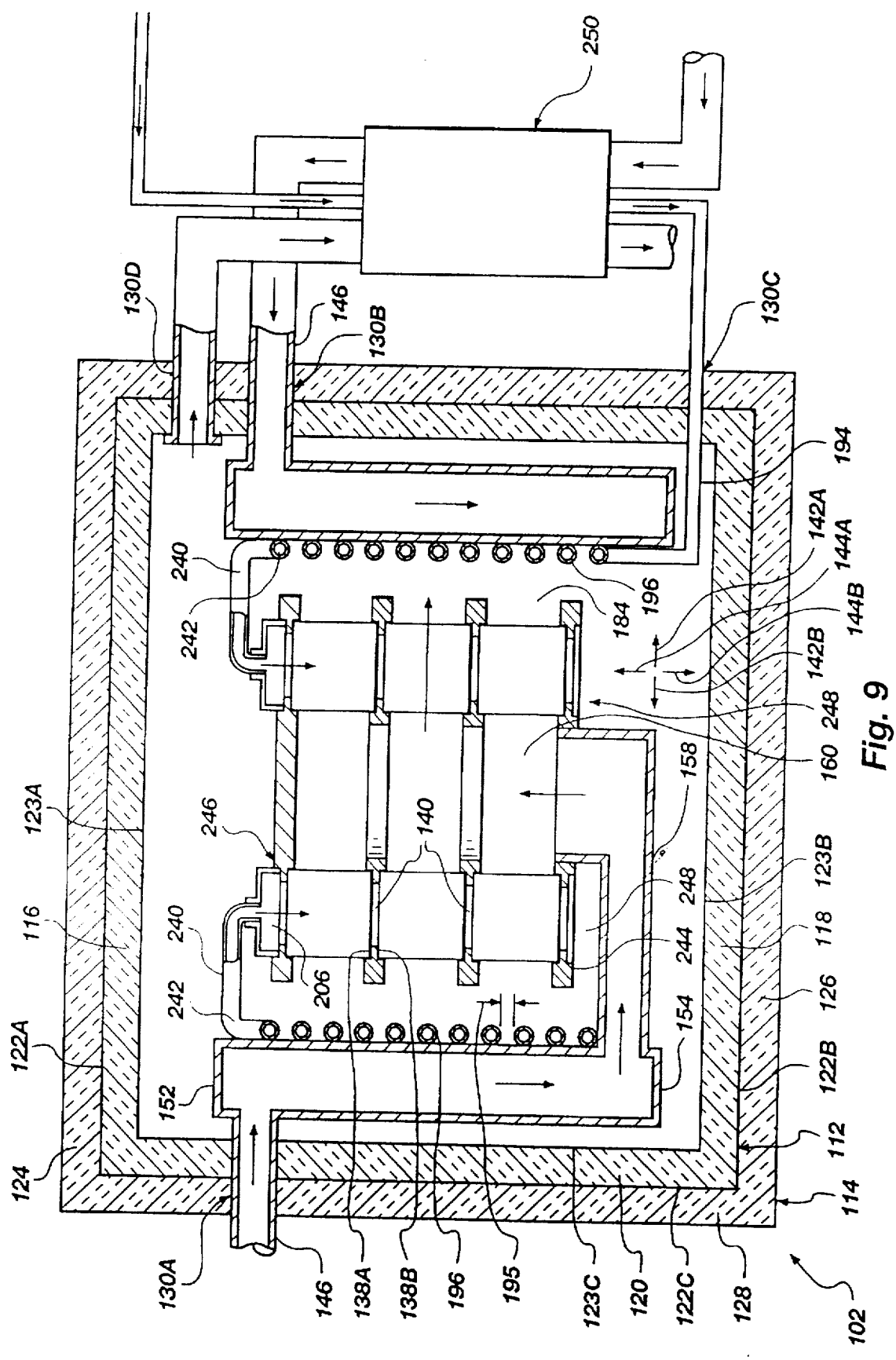
FIG. 9 is a cross-sectional, front elevation view of an apparatus of the invention.

As many apertures 130A, 130B, 130C, 130D may be provided as necessary through the enclosure 10 for passage of incoming air, feedstock 24, or exhaust between ambient and the module 106. Exhaust may be separately discharged in a fuel exhaust and an air exhaust, or combined in a single mixture to be discharged as a single exhaust after completion of combustion as illustrated in FIG. 9.

The module includes stacks 132 of individual fuel cells 134. The stacks 132 may be connected to one another in series or in parallel electrical connection, and may be connected in a combination thereof to achieve a desired voltage and current at the available wattage.

The stacks 132 are positioned within frames 136, sometimes also called manifold plates (see U.S. Pat. No. 5,298, 341). The frames 136 are provided with recesses 138A, 138B into which the stacks are fitted accessible to cavities 140 and sealed to separate and conduct fluids. Fluids are conducted in a radial direction 142 and an axial direction 144, comprising outward and inward radial directions 142A, 142B and upward and downward axial directions 144A, 144B, respectively. Air passes in an outward radial direction 142A while fuel passes in a downward axial direction 144B through a stack 132, in the preferred embodiment.

Figure 8:
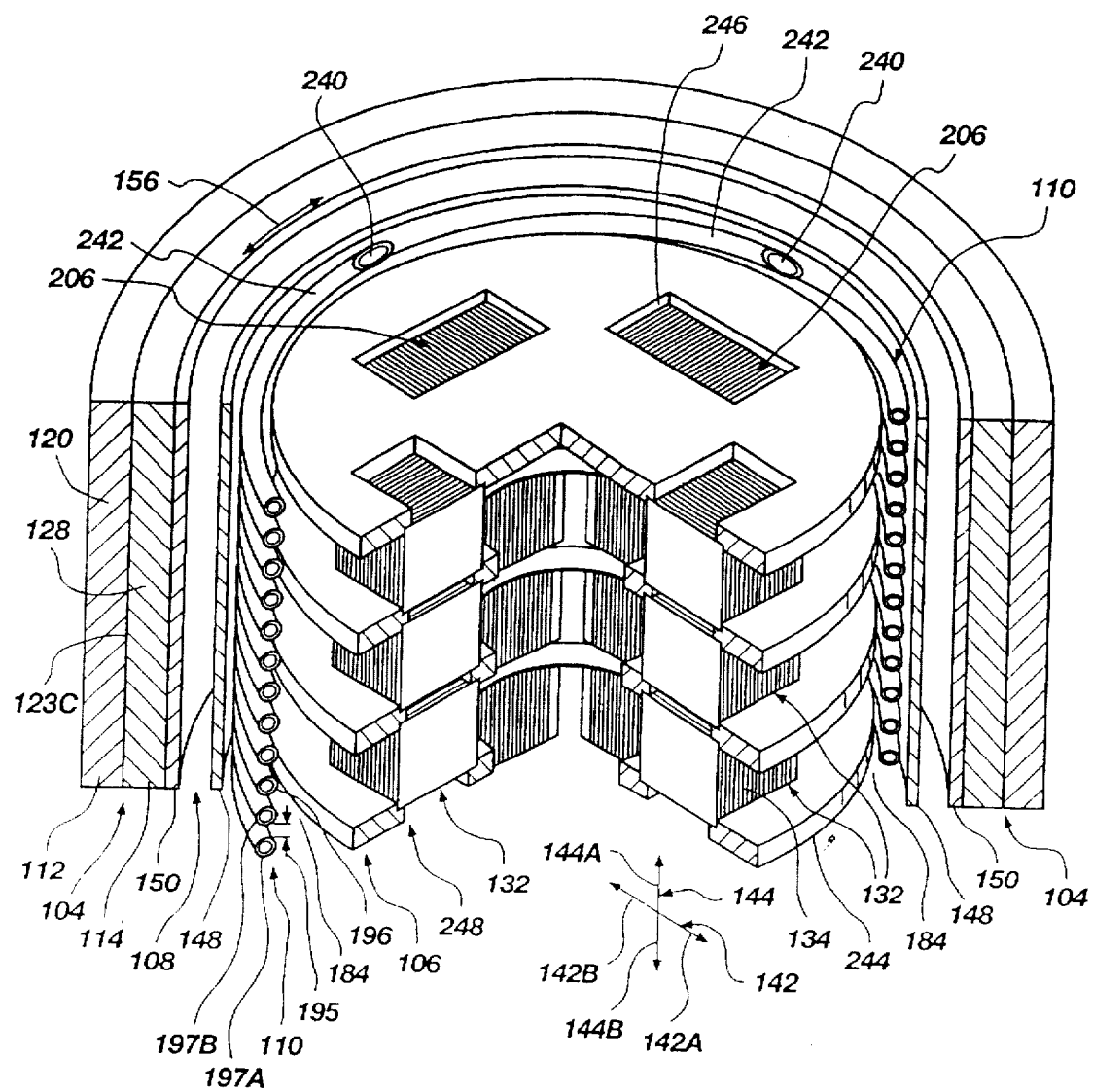
FIG. 8 is a cutaway isometric view of an apparatus of the invention configured as a thermally coupled stack furnace having a spiral conduit for a reformer.

The complete flow paths for the feedstock, fuel and air streams may vary. In the embodiments of FIGS. 8 and 9, air enters through a conduit (or conduits) 146, passing into the heat exchanger 108 comprised of inner jacket 148 and outer jacket 150 sealed together by top cap 152 and bottom cap 154 in an annular, cylindrical shape. The heat exchanger 108 can also be segmented along a circumferential direction 156. Air passes axially downward 144B, being heated by the inner jacket 148, and outer jacket 150. After passing through the heat exchanger 108, the air exits via the conduit 158 to enter a plenum 160 formed by the stacks 132 and frames 136. From the plenum 160, the air passes through the stacks 132 in an outward radial direction 142A, giving up oxygen.

Figure 10:
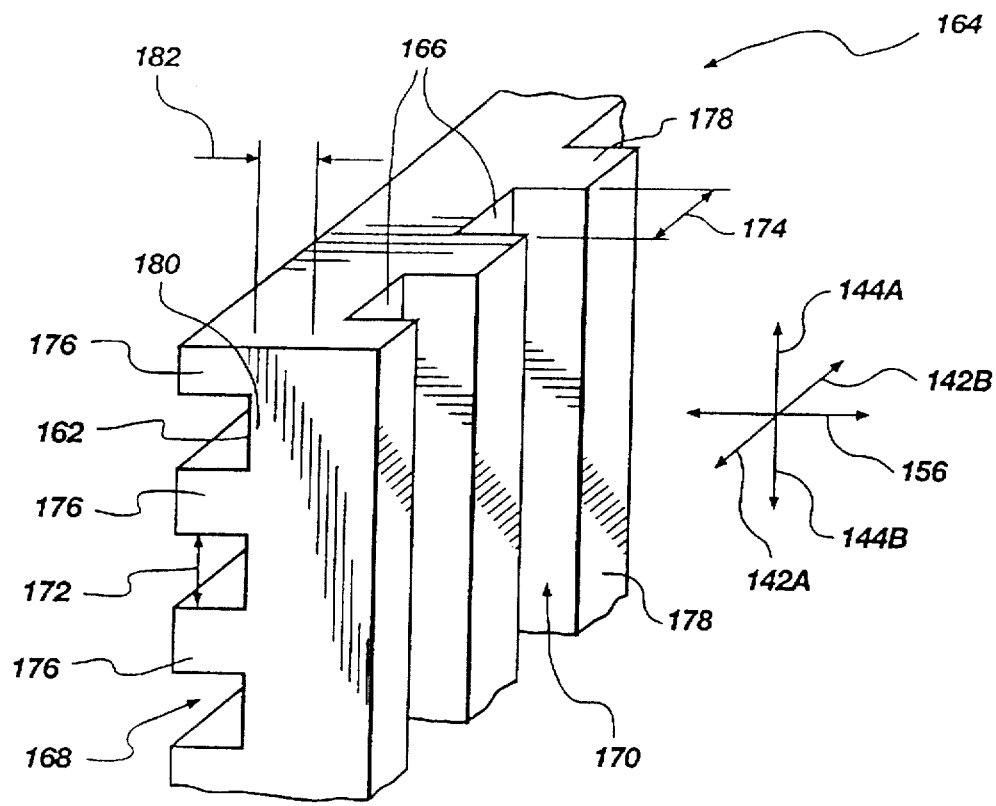
FIGS. 10 and 11 are isometric views of alternative embodiments for individual solid oxide electrolyte panels of individual fuel cells, showing the cathodic and anodic passages for air and fuel, respectively.
Figure 11:
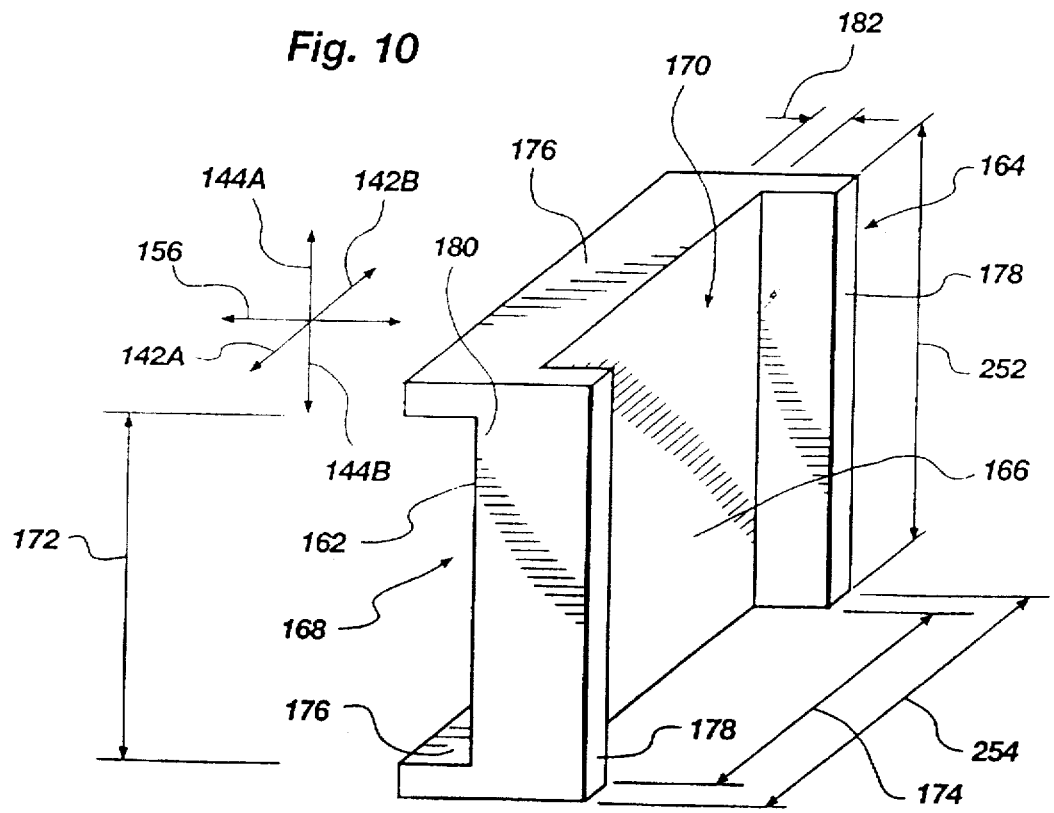

As seen in FIGS. 10 and 11, the air passes over the cathodic surface 162 of each individual plate 164 in the stack 132. Oxygen ions pass from the air through a cathodic surface 162 to an anodic surface 166, there to oxidize fuel passing in a downward axial direction 144B. The cathodic channel 168 conducting the air may have a height 172, and the anodic channel 170 conducting the fuel may have a width 174 that is narrow or almost as broad as the entire plate 164. The cathodic walls 176 and anodic walls 178 define the cathodic and anodic channels 168, 170, subdividing along the electrolyte barrier wall 180 of thickness 182. The cathodic and anodic walls 176, 178 may be many or few to accommodate the configuration chosen. The preferred embodiment of FIG. 10 creates a more even distribution of oxidation and attendant heating, reducing thermal stresses within the ceramic plate 164.

After passing over the cathodic surfaces 162 of the stacks 132, the air exits into the outer plenum 184. Having received heat rejected from the stacks 132 incident to oxidation of the fuel, the air reaching the plenum 184 may transfer heat by convection to the reformer 110 and the inner jacket 148 of the heat exchanger 108. Due to the close proximity of the reformer 110 to the module 106, within line-of-sight of the stacks 132, a significant radiant heat flux from the stacks 132 impinges directly upon the inner jacket 148.

Particularly if the heat exchanger 108 has no "radiation opaque" barriers intermediate inner and outer jackets 148, 150, the outer jacket 150 will receive substantial heat transfer by radiation from the inner jacket 148. Thus the outer jacket 150 will also convect heat to incoming air passing through the heat exchanger 108.

The reformer 110 may be welded to the inner jacket 148 of the heat exchanger 108 as illustrated in FIG. 8 or spaced away from the inner jacket as illustrated in FIG. 9. The reformer 110 may be configured to expose to, or shield from, the stacks' 132 radiation the inner jacket 148 in either circumstance. Effective shielding depends on the distance 195 between successive turns 197A, 197B of the tubing 196 of the reformer 110.

Figure 13:
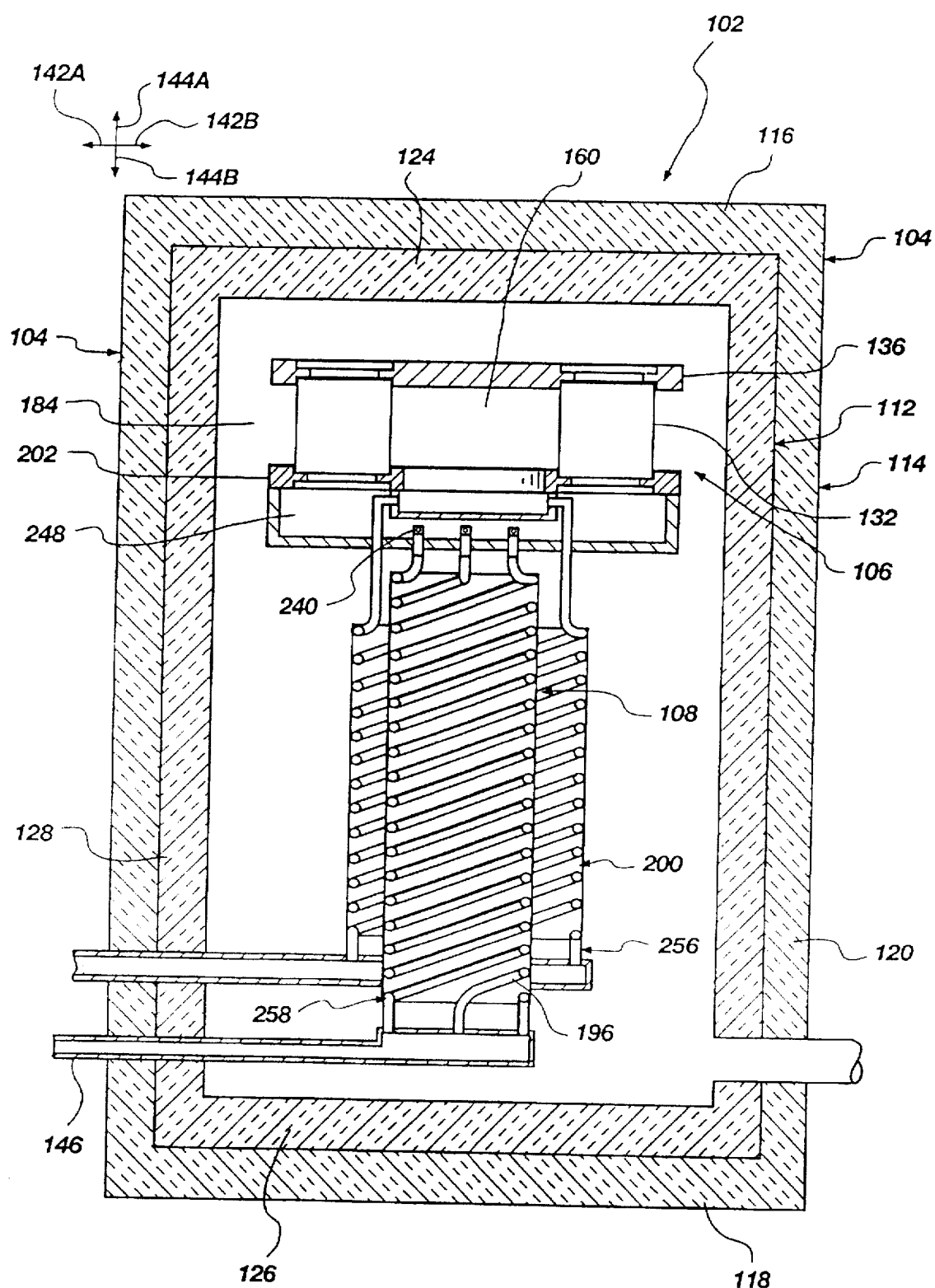

The entire reformer may be spaced axially away from the stacks 132 in the plenum region 198 as illustrated in FIG. 13. In this configuration, the air flows through a preheater 200 prior to entry into the plenum 160. The reformer 110 and an air preheater 200 receive convective heat transfer only, being shielded from the stacks 132 by a base plate 202, the lowermost one of the frames 136.

Referring again to FIGS. 8–23, the fuel, like the air, passes through several heat transfer processes and flow paths, beginning as a feedstock comprised of a hydrocarbon compound, such as methane or a petroleum-based vapor, and water. The feedstock may be bubbled through a warm water bath (not shown) or may have a portion of its own water of combustion fed back into the feedstock flow prior to (upstream of) entry of the feedstock into the reformer 110. The feedstock is preferably preheated in a preheater (heat exchanger) 200 or in a recuperator (heat exchanger) 204 positioned and connected to receive convective heat transfer from any and all fluid exiting the stacks 132, including fuel exhaust, air exhaust or a combined, combusted fuel and air exhaust.

As shown in FIG. 9, the feedstock may enter the enclosure 104 via the conduits 194, which may be manifolded. That is, the conduit 194 may be subdivided into, or may simply enter the enclosure 104 as, individual tubes 204A, 204B, 204C and 204D (see FIG. 20), all similarly or identically constructed and referenced generally as reformer tubes 196.

The feedstock, comprising water (in vapor phase, typically) and a hydrocarbon such as methane passes through the tubes 196 primarily in a circumferential direction 156, but spiraling in the axially upward direction 144A toward a plenum 206 feeding fuel downward into the stacks 132. Within the tube 196, the feedstock is exposed to a catalyst and heat rejected from the stacks 132, reforming the feedstock into a fuel of carbon monoxide and hydrogen.

In one embodiment of the reformer 110, twelve reformer tubes 196 pass the feedstock in an axially upward direction 144A past the stacks 132 and in close proximity thereto. Reformed fuel exits the reformer tubes 196 into the plenum 206 above each stack 132 in the top tier 208A. The number and geometry of reformer tubes 196 is designed for proper radiation heating of the reformer tubes 196.

The reformer tubes 196 in the embodiments of FIGS. 8–23 benefit from an excess of catalyst. The tubes 196, as illustrated in FIGS. 15–19 may have large interior surface areas coated with catalyst in order to insure that all reactants have access to reaction sites. For example, in FIG. 15 the reformer 110, generally comprised of one or more of the tubes 196 or reformer tubes 196, has a wall 210, having an outside surface 212, with an inside surface 214 spaced across a wall thickness 216. Disposed along the inside surface 214 may be fins 218 of width 220 and length 222 coated with catalyst on the surfaces 224 exposed to the feedstock.

Figure 16:
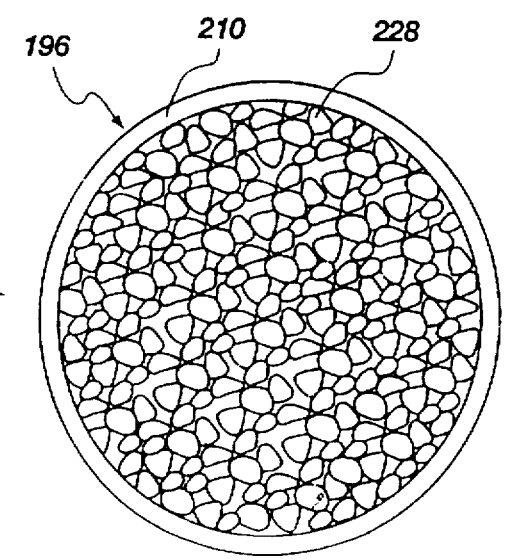
Figure 17:
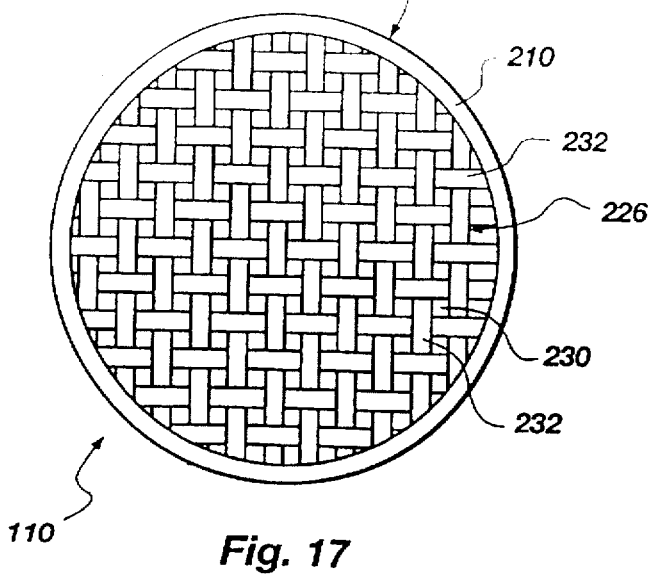
Figure 18:
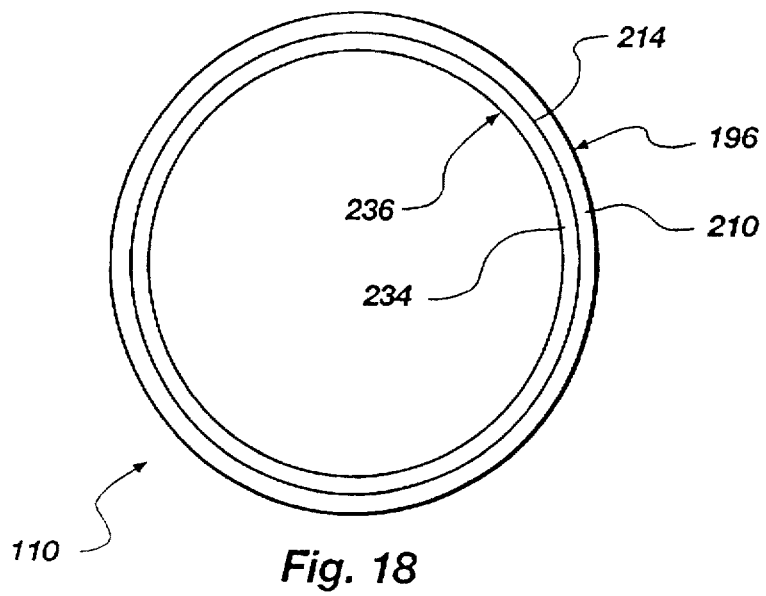
Figure 19:
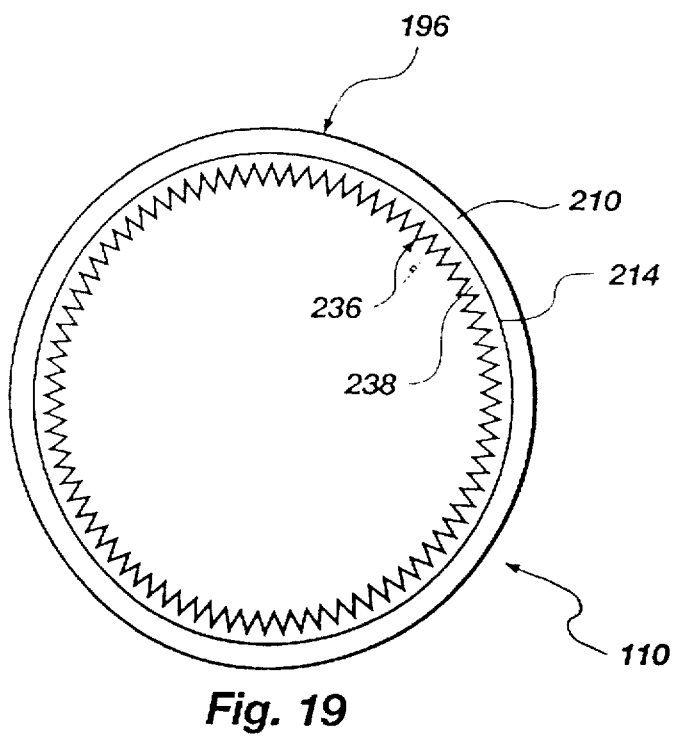
Figure 21:
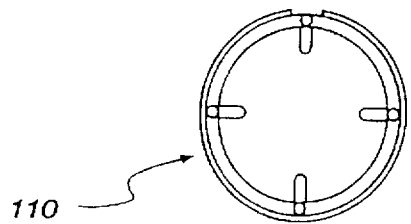
FIGS. 20 and 21 are top and bottom plan views, respectively, of a reformer of the invention.
Figure 22:
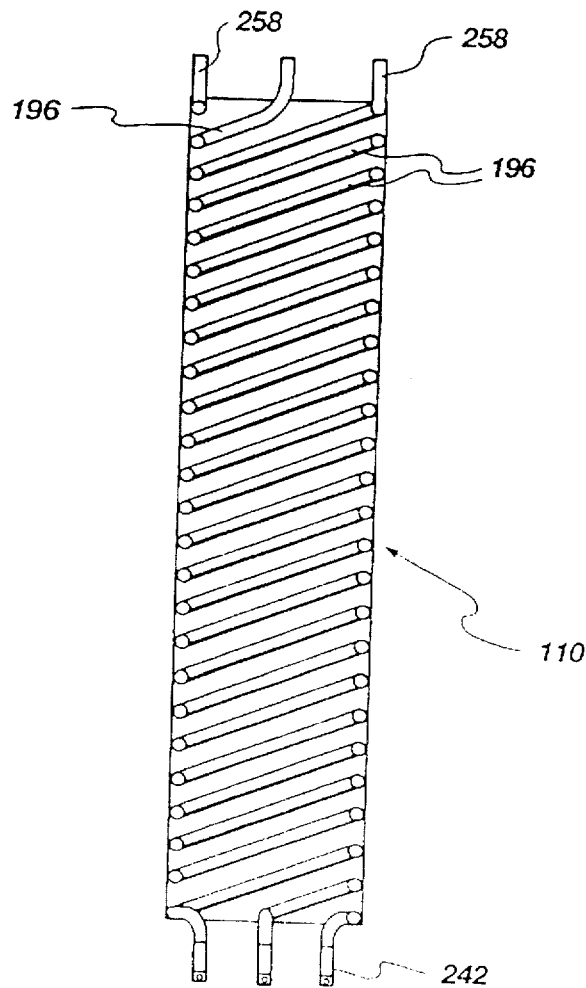
FIG. 22 is a sectioned elevation view thereof.
Figure 20:
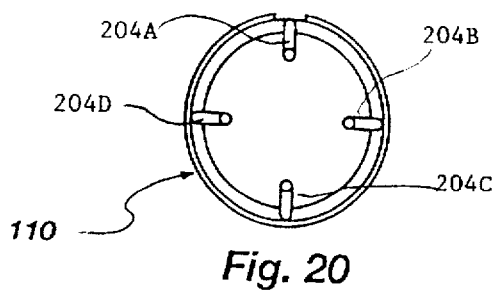
Figure 23:
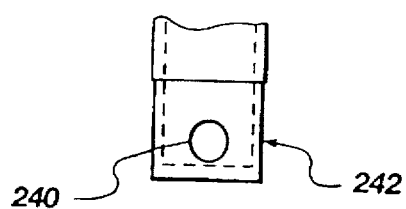
FIG. 23 is a detailed elevation view of the end of a tube of the reformer of FIG. 20.

Alternatively, as in FIG. 16, the tube 196 may be filled with granules 226 coated with catalyst to form a tortuous path for the feedstock to flow through. FIG. 16 illustrates catalyst-coated screens 228 which may stacked inside a tube 196 forcing the feedstock to pass through the interstices 230 around the wires 232 of the screen 228. FIG. 18 illustrates a layer 234 of catalyst disposed on the inside surface 214 to leave a smooth surface 236, while FIG. 19 presents a rough layer 238 for increasing exposure of the feedstock to catalyst.

Excess catalyst and surface area are means to compensate for the lack of temperature graduation due to a lack of shielding. Also they compensate for temperatures of the incoming feedstock being potentially as high as those of exiting fuel. The excess catalyst is to insure that the reformation processes' rates of reaction at a molecular level become heat limited, progressing as fast as heat is available for endothermic reactions. "Heat limited," by limiting carbon buildup, stands in contrast to "site limited" (the "traffic jam" discussed above). Thus, the excess of catalyst prevents fouling or poisoning of the catalyst by elemental carbon or other intermediate reaction products.

The reformer tubes 196 receive heat by radiation directly from the module 106, generated by oxidation in the stacks 132 and distributed throughout the module by exhaust flows and re-radiation. The stacks 132 radiate heat to the reformer tubes 196 while also discharging air exhaust directly over the reformer tubes 196. With the addition of heat to the feedstock in the reformer 110 by conduction through the tube walls 210 of the reformer tubes 196, virtually all of the hydrocarbon in the feedstock is reformed to fuel prior to exiting the port 240 into the plenum 241 positioned at the outlet end 242 of the reformer tubes 196. The port 240 may discharge into the plenum 241 to be redistributed through other ports 243 placed in the frames 136 proximate the stacks 132. The ports 240 may discharge directly into the frames 136 as at the plenum 206 formed at the stacks 132 in the frames 136.

The port 240 may be positioned to discharge fuel at the bottom 244 of the module 106 or at the top 246, such that the fuel flows in an axially upward direction 144A or an axially downward direction 144B, respectively. In a preferred embodiment, fuel flows in an axially downward direction 144B through stacks 132 positioned axially adjacent in the tiers 208A, 208B, 208C. Each plenum 206 feeds fuel into the top of a stack 132 in the top tier 208A of the module 106.

From the plenum 206, the fuel passes vertically, in parallel paths, in an axially downward direction 144B through the anodic channels 170 of the fuel cells 134. Simultaneously, air passes in a radially outward direction 142A through the cathodic channels 168 of the same fuel cells 134. The fuel passes in series through each stack 132 to another stack 132 positioned therebelow. A proportional fraction of the fuel is oxidized within the stacks 132 of each tier 208A, 208B, 208C. Thus, each fuel cell 134 experiences a reduced change of fuel concentration in the axial direction 144B compared to that which would occur if a stream of pure fuel were required to completely react within a single fuel cell 134. The fuel exits at the plenum 248 as fuel exhaust comprising principally carbon dioxide and water vapor and containing significant recoverable heat.

Fuel exhaust may be routed out of the enclosure 104 through a means analogous to the conduit 194 for incoming feedstock, but is preferably discharged directly from the stacks into the plenum 248, which may be a separate cavity, but is preferably part of or connected to the plenum 184. Thus, the air exhaust and the fuel exhaust are mixed together in the plenum 184 at temperatures sufficient to sustain a reaction completing combustion and releasing additional heat. Such combustion is one reason why the configurations of FIGS. 12 and 13 are feasible even with relatively modest radiation heat transfer from the stacks 132 or the module 106.

The combined exhaust is preferably passed from the plenum 184, which may simply be a region within the enclosure 104, through the heat exchanger 250, also called a recuperator 250. One or more recuperators 250 may be used, and may be positioned inside or outside of the enclosure 104, or at both locations. Recuperators 250 may even be disposed at one or more locations within the insulating wall 116, to maximize heat recovery from the exhaust into the incoming fuel and air. This preheating reduces the need for heat in the reformer 110, and renders the feedstock and air more readily reactive upon entry into the reformer 110 and fuel stacks 132, respectively.

Figure 12:
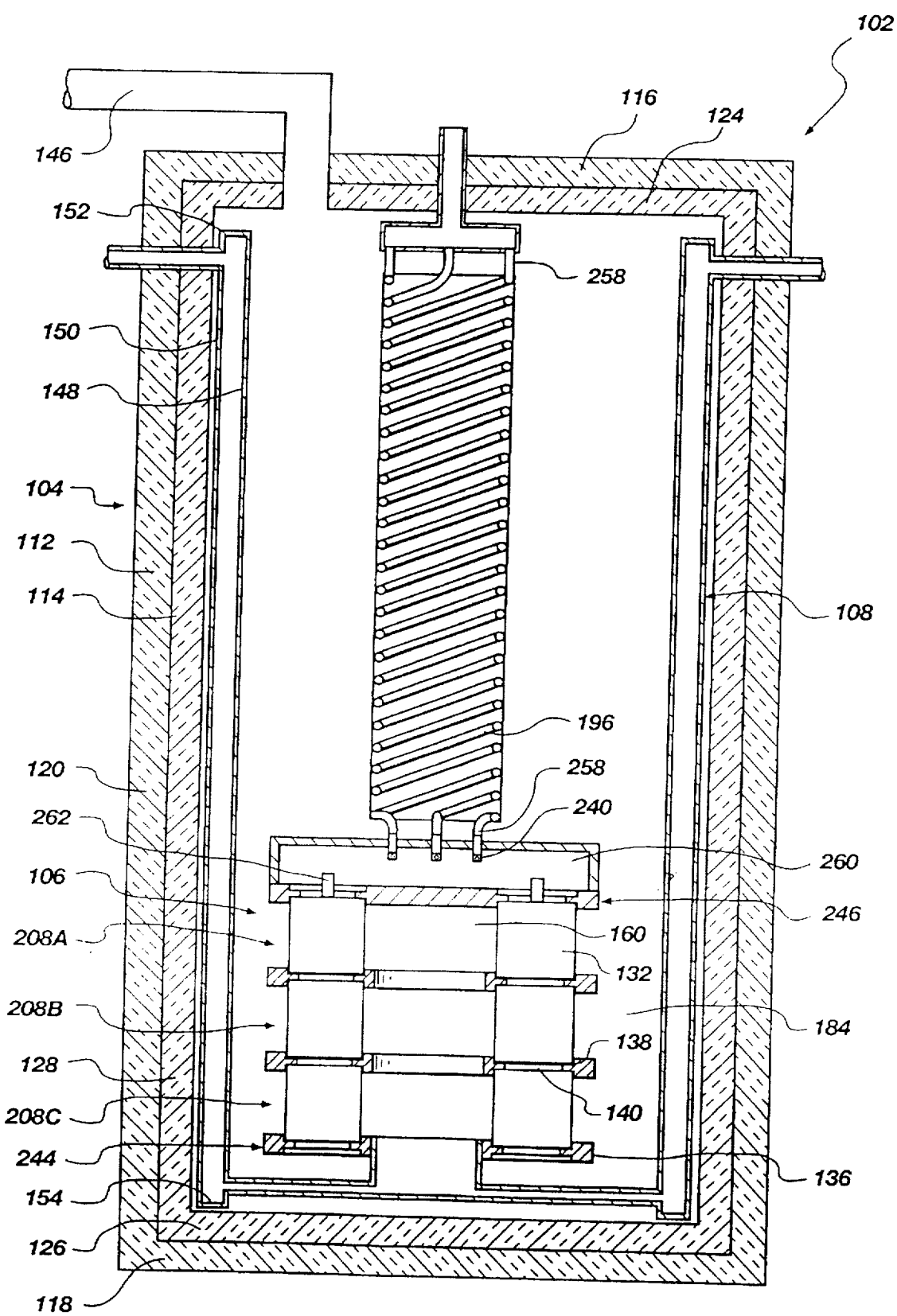
FIGS. 12 and 13 are partially cutaway, front elevation views of alternate arrangements for the stack furnace and reformer of the invention.
Figure 14:
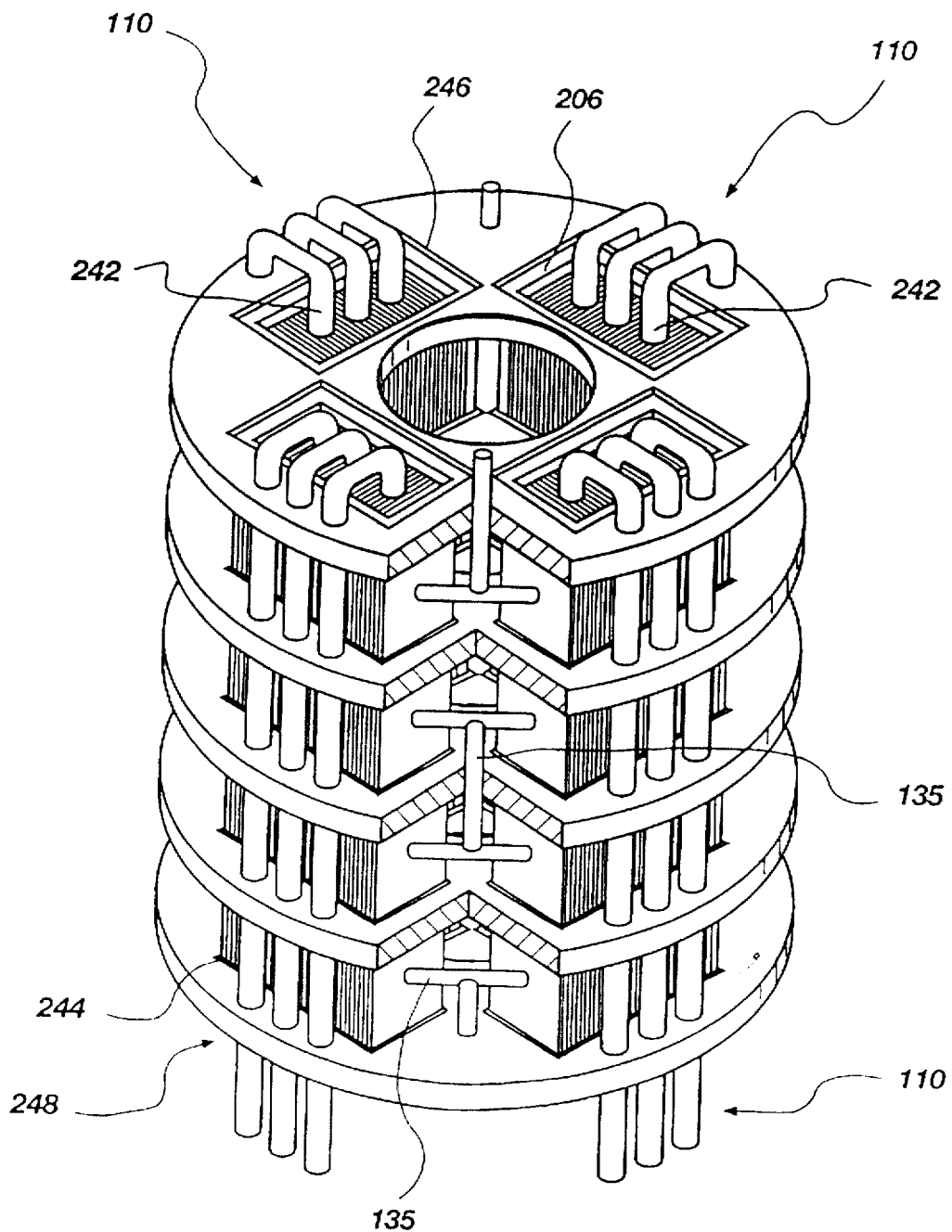
FIG. 14 is an isometric view of an alternate embodiment of the apparatus of the invention having reformers oriented vertically and positioned outside the stacks.
Figure 15:
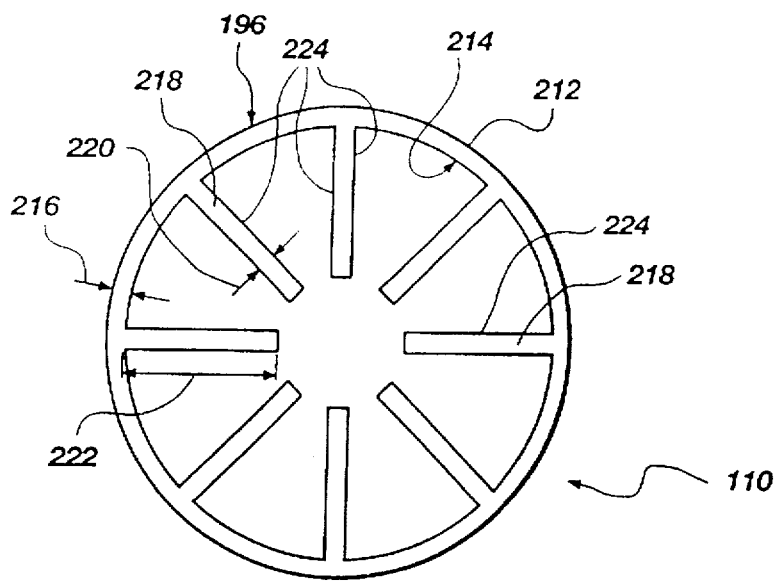
FIGS. 15–19 are cross-sectional elevation views of alternate embodiments for disposition of the catalyst in the tubing of the reformers of FIGS. 8 and 11.

Compared to the configurations of FIGS. 12 and 13, the configurations of FIGS. 8, 9, and 14 have much greater thermal coupling between the stacks 132 and the reformer 110 and between the stacks and the heat exchanger 108. Those configurations expose the reformer 110 and the heat exchanger 108 to large radiant heat fluxes from the stacks 132 and the rest of the module 106, large convective heat fluxes from the air exhaust exiting the stacks, and large convective heat fluxes from the combustion of air and fuel exhaust. The configuration of the reformer 110 of FIGS. 20–23 is adaptable for use in the TCSF configurations of FIGS. 8 and 9, and may generally be positioned inside or outside of the structural wall 112, but preferably within the insulating wall 116.

Maximization of thermal coupling is important in the design of a completely self-sustaining TCSF. The feedstock in the endothermic reformation process must receive enough heat, after losses and inefficiencies, to produce fuel sufficient to sustain oxidation in the stacks 132 of fuel cells 134. In turn, the fuel cells 134 must produce enough exothermic oxidation to reject sufficient heat to operate the reformer 110. At any expected operating level less than peak electrical output (highest fuel usage), a TCSF 102 must still be self sustaining. Otherwise, reformation must occur at a remote site, diminishing the value of hardware used for incomplete or inadequate integration of the reformer 110, module 106, and heat exchanger 108.

Positioning the reformer 110 within the enclosure 104, effectively surrounding the module 106, and in the path of all exhausting fluids maximizes the thermal coupling of the TCSF 102. Proper geometric relationships, dwell times for fluids to pass through the TCSF, and insulation effectiveness improve thermal recovery and coupling. The close proximity of all components of an integrated TCSF 102, render possible self-sustaining TCSF's 102 of relatively smaller size and output. Likewise, integrated TCSF's 102 can operate successfully at off-design electrical output levels, that is, at less than their optimum or maximum operational output rating.

The invention is further explained by the following illustrative examples:

EXAMPLES

Example I

Figure 4:
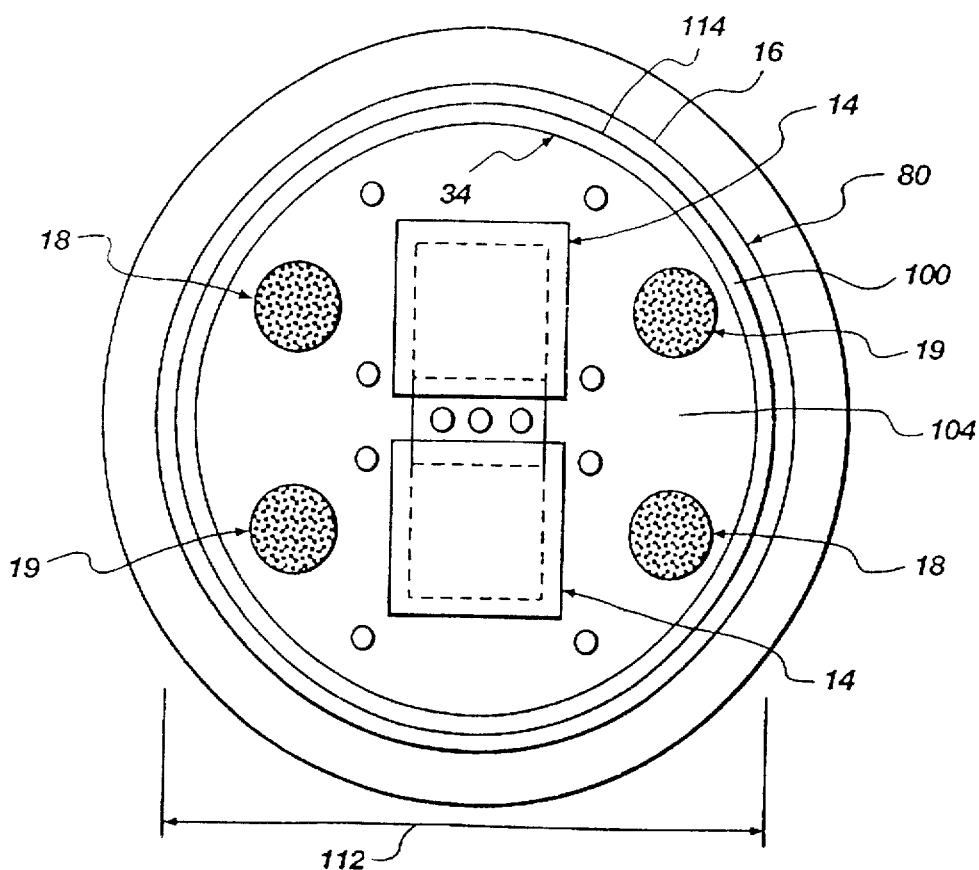
FIG. 4 is a schematic plan view of two thermally integrated reformers arranged with two rectangular-plate-type stacks of fuel cells.

As illustrated in FIGS. 2 and 4, the apparatus can be constructed as a 2 kW class methane-fueled thermally self-sustaining system. The four main components of such a system are the stacks 14, the enclosure or furnace wall 38 of the stack furnace 12, the fuel reformer-preheater 10, and the air recuperative heat exchanger 80. These components have been combined in an integrated system. The heat exchanger 80 is imbedded in the furnace wall 38 of the stack furnace 12 containing both the fuel cell stacks 14 and the fuel reformer-preheater 10 (reactors 18, 19).

The air heat exchanger 80 is the primary structure of the modular enclosure formed by the furnace wall 34. The high temperature of SOFC operation requires materials having structural integrity at elevated temperatures. Ceramics and other refractory materials or alloys such as INCONEL™ may be used in the heat exchanger 80. System efficiency is also affected by the effectiveness of the heat exchanger 80. Air preheating rate or preheat duty is about 4 kW per kW of electrical output. If this heat is not recoverable from the exhaust air stream, then the maximum system efficiency would be 20% (1 kW out/[1 kW+4 kW] in). The temperature difference available to drive the heat exchanger 80 is the temperature rise (150°–200° C.) of the air as it cools the SOFC stacks.

A large heat transfer surface area or high heat transfer coefficient is necessary to minimize the temperature driving force required by the heat exchange duty. Increasing the heat transfer coefficient generally increases the pressure drop across the heat exchanger 80 which increases pumping costs and sealing difficulty. A large surface area requires greater amounts of the costly, high-temperature alloy.

Figure 6:
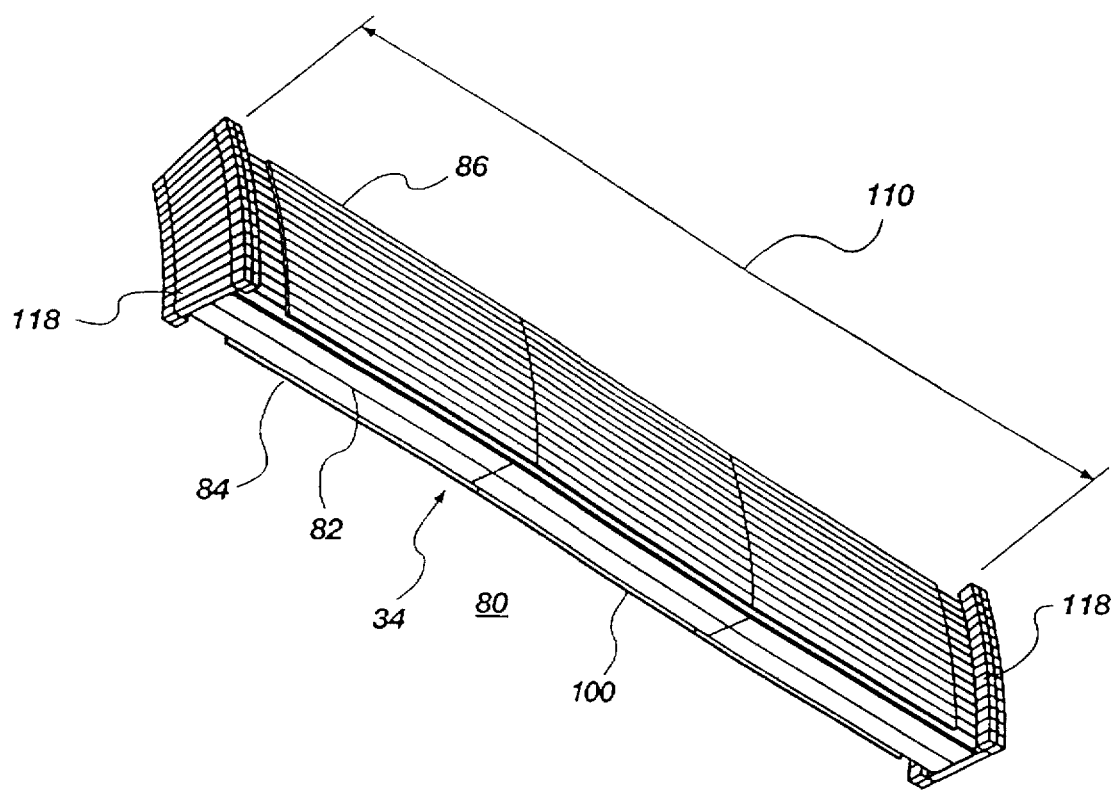
FIGS. 6–7 are isometric views of the heat exchanger of FIG. 5 illustrating the inlet and outlet passages at each end of the exchanger.
Figure 7:
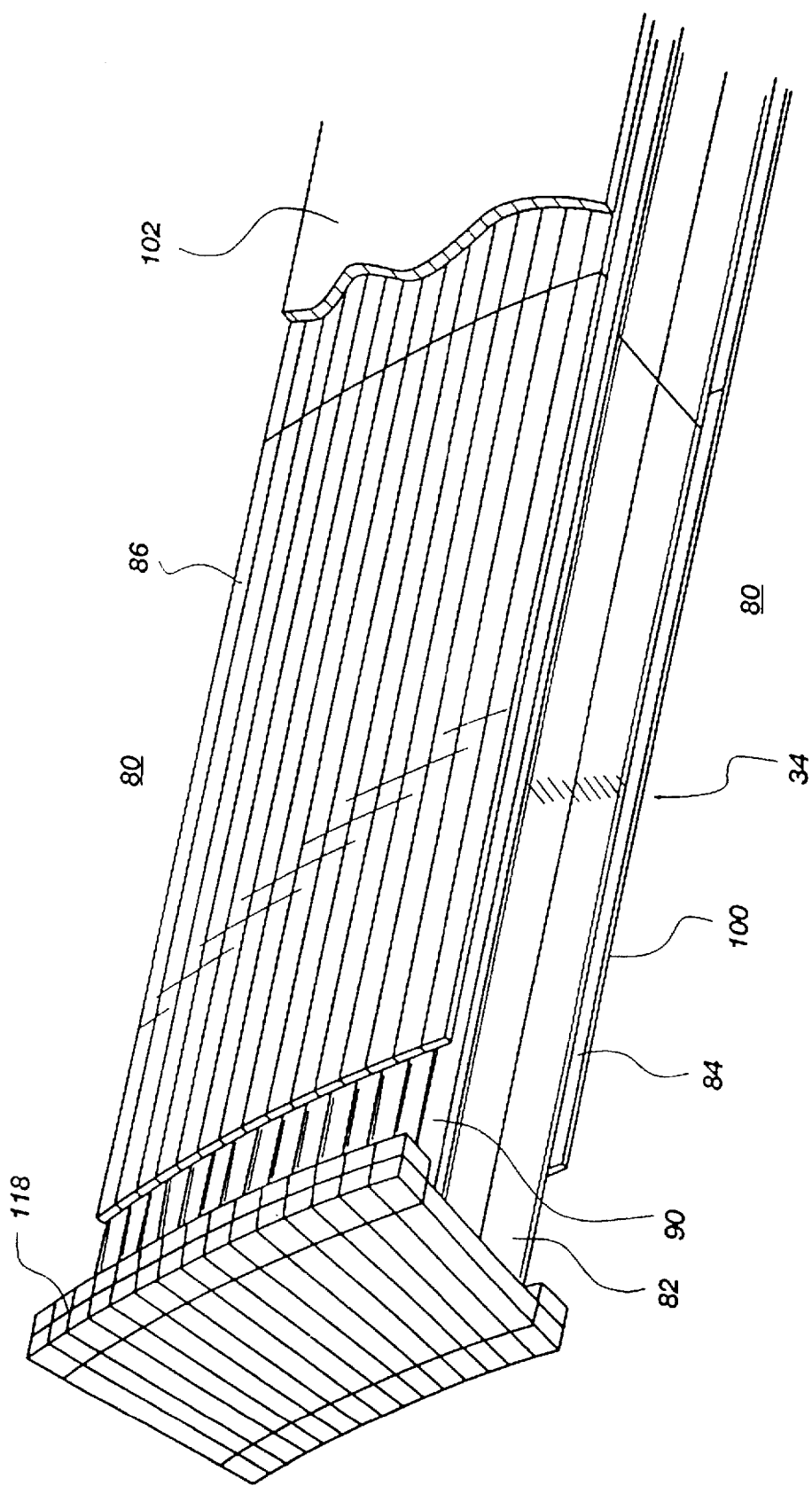

In FIGS. 5–7, a plate fin heat exchanger configuration minimizes the total amount of material per unit of heat exchange area. This configuration employs a corrugated sheet as fin 82, forming the primary heat exchange surfaces, with inner and outer walls 84, 86 formed of smooth sheets for gas containment. The cross section of the heat exchanger 80 appears similar to that of a cardboard box. The heat exchanger 80 is wrapped to be cylindrical, forming or fitting along the furnace wall 38 with the gas flow channels 88, 90 oriented in the resulting cylinder's axial direction 91. Incoming air flows downward through the outer channels 90 counter to the hot exhaust air which flows upward through the inner channels 88. The interior or inner wall 84 of the cylindrical heat exchanger 80 forms the volume in which the stacks and reformer 10 (reactors 18, 19) are enclosed. A thin layer of insulation 100 on the inner wall 84 of the heat exchanger 80 limits the heat loss from the plenum 104 of the stack furnace 12 to the cold areas of the heat exchanger 80. Thicker insulation 102 surrounds the exterior of the heat exchanger 80.

Example II

As shown in FIGS. 5–7, design parameters for a 5 kW system which would minimize total weight of high temperature alloy in the heat exchanger 80 include fin spacing 106, fin depth 108, cylinder height 110 and diameter 112, heat transfer duty, temperature driving force, and pressure drop. Either Monte Carlo or conjugate gradient optimization methods may be used to determine an optimized design. The optimized system has a height of 0.38 m and a diameter of 0.33 m with a fin height of 2 cm and a fin gap of 2 mm. The calculated combined are of the fin 82 is 4.2 m$^2$ and the area of the two face sheets forming the inner and outer walls 84, 86 totals 5 m$^2$.

The actual dimensions were changed somewhat to accommodate clearances necessary for fabrication. The inner diameter 112 of the heat exchanger 80 is 39.4 cm to allow for more insulation. "INCONEL™" sheet 0.46 mm thick and 41 cm wide, available from Inco Alloys International, Inc. of Huntington, W. Va., can be fabricated by Robinson Fin Machines, Inc. of South Kenton, Ohio into corrugated sheet. The fin depth 108 is 1.9 cm with a fin spacing 106 or pitch of 2.8 mm on the inside circumference 114 and 3.2 mm on the outside circumference 116. The corrugated sheet (fin 82) is attached to end flanges 118 by a powdered metal brazing process. Corrosion perforations in the fin 82 near the brazed locations should be avoided. The flanges 118 should be removed, and any perforated length of fin 82 cut off if this occurs. In actual tests, the final heat exchanger 80 had a height 110 of only 0.36 m for this reason, and an extension (not shown) accommodated the length discrepancy. Actual core surface area of the fin 82 in the heat exchanger 80 was 3.3 m$^2$.

Thermal tests established performance of the heat exchanger 80. Gas burners were installed in place of the SOFC stacks (columns). Thermocouple readings were taken for combinations of air and fuel flow rates which would simulate operation of a 1–3 kW SOFC. Insulation and sealing materials were added to reduce heat and air losses, bringing observed performance nearer the performance predicted by a no-loss analysis. A 1 kW system operating at 0.6 V per cell and 50% fuel utilization should be thermally self-sustaining. Larger systems should be self-sustaining and yield even higher operating efficiencies.

Reforming external to the stacks, but thermally coupled with the stacks, had improved system performance in previous testing. Risk of carbon formation was also shown to be minimized by tracking the reforming reaction equilibrium composition throughout fuel preheat. The reforming system was designed in accordance with these concepts.

Haldor Topsøe R-67-7H steam reforming catalyst was used in the packed beds 30, 60 of reactors 18, 19 in the reformer 10. This is a supported nickel catalyst in the form of the granules 32, each a cylindrical pellet 16 mm in diameter and 8 mm in height, with 7 holes through the axial direction of the pellet. The rated operating temperature range is 300°–1400° C. for the granules 32. Haldor Topsøe, Inc. of Houston, Tex., the manufacturer, reports that for most applications an approach to equilibrium of less than 10° C. is possible, but reports reformer operation at steam to carbon ratios below one.

The container walls 34, 64 of the reactors 18, 19 of the reformer 10 were made from 5 cm (2 inch) schedule 10 INCONEL™ pipe 30.5 cm long. An approximately 9.5 mm INCONEL™ tube (inlet 56) feeds the feedstock in a gas phase to the bottom of the catalyst bed. The feedstock flows upward through the bed and exits downward through another 9.5 mm tube (return pipe 52) which penetrates the center of the catalyst bed. Two packed beds 30, 60, inside the container walls 34, 64, were placed in series as shown in FIG. 3 forming each of the two columns or reactors 18, 19. The lower half of the upstream reactor 18, 19 of the reformer 10 was wrapped with kaowool insulation which also acted as a radiation shield (insulated shield 46) in that area. INCONEL™ radiation shields 42, 44, were placed on the top half of the first reactor 18 and the lower half of the second reactor 19.

The reforming reaction is generally considered to be limited by the heat transfer rate. However, at lower temperatures, reaction kinetics may be rate-limiting. Extremely high radiant heat fluxes would be expected near the relatively cool reformer inlet 22. High heat fluxes combined with lower reaction rates near the inlet 56 could result in substantial departures from equilibrium and increased risk of carbon formation. The insulated radiation shield 46 and other radiation shields 42, 44 are used to lower the initial heating rate and to provide a low temperature "adiabatic" pre-reformer for the higher hydrocarbons found in natural gas. The ideal temperature rise and reaction rate progression, should be determined by analysis of a kinetic expression. Heat transfer to the reformer core is augmented by counter-current heat transfer from the exiting reformate (flow predominantly of fuel).

Each reformer has a pair of reactors 18, 19 that can supply a 2.5 kW stack column with a space velocity of 350 hr$^{-1}$ and a reformer pressure drop of 1 m $H_2O$. This space velocity is lower than the 2000 hr$^{-1}$ suggested by manufacturers of SOFC units. Other considerations such as pressure drop, surface to volume ratio of the container 34, 64, diameter ratio of the pellet (granule 32) to the container 34, 64, thermal shielding, and catalyst deactivation allowance were involved in determining the reformer configuration. Even at this low space velocity, the cost of the reforming catalyst is only $8.40/kW. A prototype reformer and desulfurizer were operated for several weeks on pipeline natural gas. A steam to carbon ratio of 1.6 was used and 99.8% conversion of methane was obtained.

Example III

Two examples of a basic thermally coupled stack furnace (TCSF) 102 were constructed and tested. These examples are best understood by reference to FIGS. 10-13, and 20-23.

The first TCSF 102 was configured as illustrated in FIG. 12A, using a reformer configured as illustrated in FIGS. 20-23. A module 106 was constructed in three tiers 208A, 208B, 208C, each having four stacks 132 of fuel cells 134 arranged around the plenum 160. Both the height 252 and width 254 of the plates 164 were approximately 2 inches. Each stack 132 contained 24 fuel cells 134.

Incoming air was passed into the heat exchanger 108 between the inner and outer jackets 148, 150. Exiting the heat exchanger 108, the air passed axially upward 144A into the plenum 160, then radially outward 142A through the cathodic channels 168 of the fuel cells 134 of the stacks 132. The air exited the stacks 132 to the plenum 184 contiguous with the remainder of the interior of the enclosure 104.

Fuel, rather than feedstock, was introduced into the ends 258 of the reformer tubes 196 comprising the reformer 110. The four reformer tubes 196 were wrapped in a spiral shape, each terminating in a port 240 formed in an end 242. The reformer 110 was positioned above the module 106 inside the enclosure 104. Fuel from the reformer discharged axially downward 144B into the plenum 260 through the ports 240.

The plenum 260 redistributed the fuel through ports 262 among the four stacks 132 in the top tier 208A of the module 106.

The fuel passed through the anodic channels 170 of the plates 164 of the fuel cells 134 in the stacks 132, oxidizing to generate a current. The oxidized fuel exhaust was mixed with the air exhaust in the enclosure 104 to complete combustion and add heat to the reformer 110 and preheater 200.

The air flow was 200 liters per minute, while hydrogen fuel flowed at 16 liters per minute. The enclosure was maintained at 800° C. The stacks were electrically connected in two equal series connected in parallel, operating at a total open circuit voltage of 176 volts. Due to a short to ground in the apparatus, the stacks delivered only twenty-five (25) watts of electrical power. The heat exchanger 108 and reformer 110 were found to transfer sufficient heat to render the oxidation and reformation processes self sustaining at a fuel flow corresponding to 500 watts of heat output.

Example IV

Another example is best understood by referring to FIGS. 10-12, and particularly FIG. 13. A module 106 was constructed having four stacks 132 arranged around a single tier 208A in the plenum 160. The height 252 and width 254 of the plates 164 were approximately 4.4 cm (1.75 inches). Each stack 132 contained 29 fuel cells 134.

Incoming air was passed into the inlet 256 to the preheater 200 positioned below the module 106. Exiting the preheater 200, the air passed radially upward 144A into the plenum 160 and radially outward 142A through the cathodic channels 168 of the fuel cells 134 of the stacks 132. The air exited the stacks 132 to the plenum 184 contiguous with the plenum 248.

Methane was bubbled through a water bath (not shown) held at 86° C. to form a feedstock of water vapor and methane in a ratio of 1.6:1. The feedstock was introduced into the lower end 258 of the reformer 110, formed by wrapping the reformer tube 196 in a spiral shape inside the preheater 200. The reformer tube 196 was coated inside with a mixture of nickel oxide and zirconia, but could also be packed with granulated catalyst as previously described. Heat was introduced into the enclosure 104 to maintain temperatures, because the projected operational conditions associated with the 100 watt power rating of the experimental module 106 was deemed insufficient for self-sustaining reformation and oxidation.

The feedstock was reformed to hydrogen and carbon monoxide fuel in the reformer and discharged into the plenum 260. The plenum 260 redistributed the fuel through ports 262 among the four stacks 132 in the module 106. The fuel passed through the anodic channels of the plates 164 of the fuel cells 134 in the stacks 132, oxidizing to generate a current. The oxidized fuel (fuel exhaust) was mixed with the air exhaust in the enclosure 104 to complete combustion and add heat to the reformer 110 and preheater 200.

The voltages of the individual stacks ranged between 21.3 and 29.2 volts. The module delivered 80 watts of electrical power.

The embodiments and examples described herein are illustrative and are not intended to limit in any way the scope of the invention which is limited only by its claims.

What is claimed is:

1. A reformer conduit structure, for reforming a feedstock, for supplying fuel gas for a fuel cell, comprising:

at least one tubular member, operably configured to be connected in fluid communication with a source of feedstock material, the at least one tubular member further being operably configured to be connected in fluid communication with at least one fuel cell, the tubular member having a hollow passageway therethrough;

at least one catalyst support member positioned within the hollow passageway of the at least one tubular member;

a catalyst material, operably disposed on the surface of the at least one catalyst support member, for prompting the conversion, by chemical reaction, of feedstock material passing through the at least one tubular member into fuel gas suitable for use in a fuel cell, upon exposure of the at least one tubular member to heat.

2. The reformer conduit structure according to claim 1, wherein the at least one catalyst support member comprises:

at least one fin member emanating substantially radially inwardly from an inner circumferential surface of the at least one tubular member.

3. The reformer conduit structure according to claim 2, wherein the at least one fin member has a substantially elongated, substantially rectangular cross-sectional configuration.

4. The reformer conduit structure according to claim 2, wherein the at least one fin member has a substantially triangular cross-sectional configuration.

5. The reformer conduit structure according to claim 1, wherein the at least one catalyst support member comprises:

at least one screen structure, positioned within and substantially extending transversely across the hollow passageway in the at least one tubular member, and having a plurality of interwoven screen members, with a plurality of interstitial passages therethrough.

6. The reformer conduit structure according to claim 1, wherein the at least one catalyst support member comprises:

a substantially roughened surface disposed upon an interior surface of the at least one tubular member.

7. A thermally coupled stack furnace comprising:

an enclosure having a wall enclosing a chamber;

a stack positioned within said chamber, said stack including at least one fuel cell having a solid oxide electrolyte for generating electricity by oxidizing a fuel flow passing over one surface of said solid oxide electrolyte with oxygen from an air flow passing over another surface of said solid oxide electrolyte, said fuel cell producing a fuel exhaust and an air exhaust; and a reformer conduit structure, for reforming a feedstock, for supplying fuel gas for the at least one fuel cell, comprising:

at least one tubular member, operably configured to be connected in fluid communication with a source of feedstock material, the at least one tubular member further being operably configured to be connected in fluid communication with the at least one fuel cell, the tubular member having a hollow passageway therethrough;

at least one catalyst support member positioned within the hollow passageway of the at least one tubular member;

a catalyst material, operably disposed on a surface of the at least one catalyst support member, for prompting the conversion, by chemical reaction, of feedstock material passing through the at least one tubular member into fuel gas suitable for use in a fuel cell, upon exposure of the at least one tubular member to heat, the reformer conduit structure being disposed, within the enclosure, in a heat receiving relationship relative to the at least one fuel cell.

8. The thermally coupled stack furnace according to claim 7, wherein the at least one catalyst support member comprises:

at least one fin member emanating substantially radially inwardly from an inner circumferential surface of the at least one tubular member.

9. The thermally coupled stack furnace according to claim 8, wherein the at least one fin member has a substantially elongated, substantially rectangular cross-sectional configuration.

10. The thermally coupled stack furnace according to claim 8, wherein the at least one fin member has a substantially triangular cross-sectional configuration.

11. The thermally coupled stack furnace according to claim 7, wherein the at least one catalyst support member comprises:

at least one screen structure, positioned within and substantially extending transversely across the hollow passageway in the at least one tubular member, and having a plurality of interwoven screen members, with a plurality of interstitial passages therethrough.

12. The thermally coupled stack furnace according to claim 7, wherein the at least one catalyst support member comprises:

a substantially roughened surface disposed upon an interior surface of the at least one tubular member.

* * * * *